United States Patent [19]
Wood et al.

[11] Patent Number: 4,757,435
[45] Date of Patent: Jul. 12, 1988

[54] STATIC-CONTROLLED CURRENT-SOURCE AC/DC POWER CONVERTER AND DC/AC POWER CONVERTER, AND PROTECTION SYSTEM EMBODYING THE SAME

[75] Inventors: Peter Wood, Murrysville; Laszlo Gyugyi, Penn Hills Township, Allegheny County, both of Pa.

[73] Assignee: Westinghouse Electric Corp., Pittsburgh, Pa.

[21] Appl. No.: 19,712

[22] Filed: Feb. 26, 1987

Related U.S. Application Data

[63] Continuation-in-part of Ser. No. 841,481, Mar. 19, 1986, abandoned.

[51] Int. Cl.$^4$ .............................................. H02H 7/125
[52] U.S. Cl. ..................................... 363/54; 363/129
[58] Field of Search ............................... 363/54, 57–58, 363/85, 87–88, 129, 136–138; 361/87, 100

[56] References Cited

U.S. PATENT DOCUMENTS 3,622,862 11/1971 Boksjo .
3,848,175 11/1974 Demarest ........................ 363/54 X
4,115,707 9/1978 Kalfus .
4,231,083 10/1980 Matsuda et al. .
4,308,578 12/1981 Tamura et al. .
4,361,866 11/1982 Shima et al. ........................ 363/129
4,578,746 3/1986 Gyugyi et al. .

FOREIGN PATENT DOCUMENTS 3435366 4/1986 Fed. Rep. of Germany ........ 363/54
0070328 6/1977 Japan .
0083268 7/1981 Japan .

Primary Examiner—Peter S. Wong
Attorney, Agent, or Firm—C. M. Lorin

[57] ABSTRACT

In a current-source GTO converter, protection against a DC fault or a commutation fault condition is provided by immediately interrupting the conduction of a GTO device which is ON and by turning ON another GTO device to allow fault current to bypass the bridge or safely pass through the bridge. As a result, protective action is immediate and an early recovery is made possible. Bypassing of the bridge is done by freewheeling, with an auxiliary GTO switch or with one of the main GTO switches. Diversionary action is done through the bridge by changing the mode of operation of the bridge from rectifier to inversion, or conversely.

7 Claims, 28 Drawing Sheets

RECTIFYING MODE

α = 90° FIRING ANGLE

α = 120° FIRING ANGLE

α = 150° FIRING ANGLE

INVERSION MODE

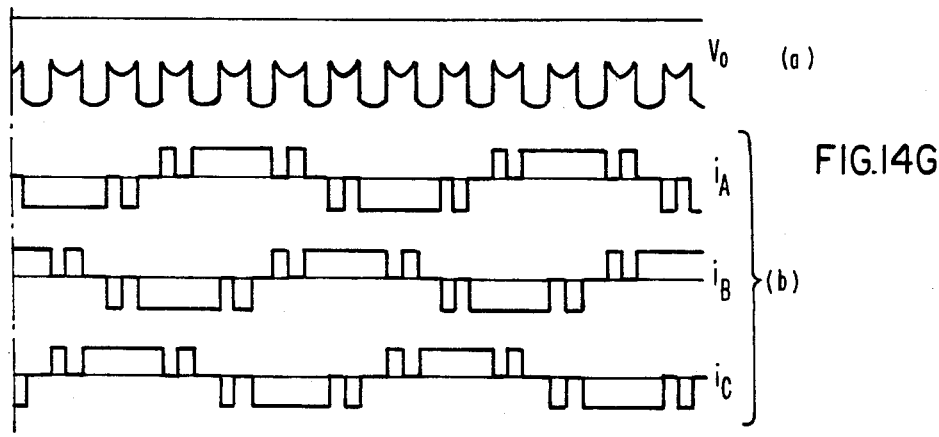
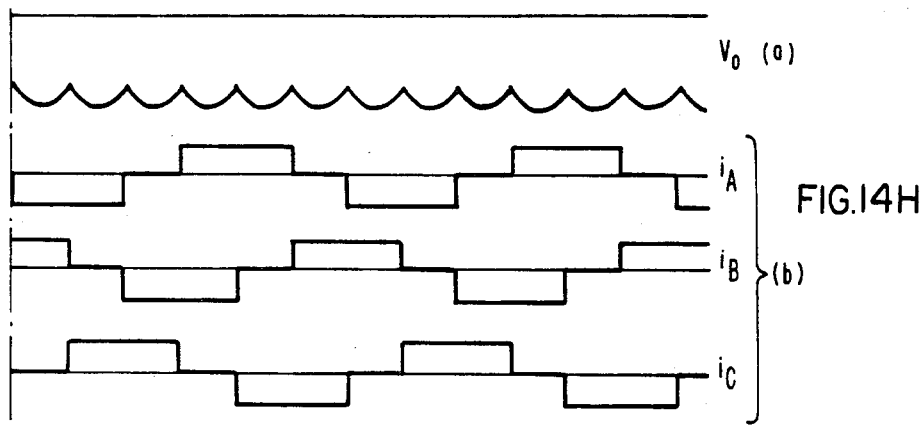

STATIC-CONTROLLED CURRENT-SOURCE AC/DC POWER CONVERTER AND DC/AC POWER CONVERTER, AND PROTECTION SYSTEM EMBODYING THE SAME

This application is a continuation-in-part of application Ser. No. 841,481, filed Mar. 19, 1986 by the present inventor and owned by the present assignee, now abandoned.

BACKGROUND OF THE INVENTION

The current-source converter, typically a three phase thyristor bridge, has been known for many years. This type of bridge has been implemented with thyristor devices because these devices have been the only existing semiconductor switching devices having the necessary voltage and current capabilities for most of the bridge applications. Initially used for DC motor drives and for general purpose DC power supplies, this type of converter has also been used for high voltage DC transmission (HVDC). More recently, it has been used for AC motor drives.

In all these applications, the thyristor bridge has to rely on the AC line voltage for commutation, i.e. "natural" commutation. As a result, it exerts a lagging quadrature current demand (operates at a lagging power factor) on its AC supply, and demand varies with both the DC current level and the DC voltage-to-AC voltage ratio. Moreover, in its basic form, the thyristor converter produces large harmonic current components into the AC source.

Despite these problems, this type of converter has received wide acceptance because it is cheap, efficient, reliable, and tolerant of fault conditions as well as being able to survive many such fault conditions. Such advantages are due to the rugged nature and the low cost of thyristors. The defects, though, stem from the switching characteristics of those devices. It has long been recognized that forced-commutation could improve the power factor behavior and that by increasing the switching rate, one can so modify the production of harmonics that smaller filters are called for. However, with thyristors as the main switching devices, forced-commutation necessitates the addition of forced-commutating circuits. These are complex, expensive, inefficient and they seriously degrade the reliability of the converter. This is the reason why forced-commutated ("self-commutated") converters have not been used extensively.

In order to overcome this, in accordance with the present invention, a solution is proposed taking advantage of the coming into existence of gate-turn-off thyristors (GTO) which allow the implementation of forced-commutation without the need for commutating circuits. The invention involves the use of GTO's in a current-source converter. The operational advantages of good power factor and better harmonic behavior are therefore brought about. Besides this, the main goal is, in the field of power converters to take advantage of the similarities between the GTO and the thyristor in implementing, with GTO's, fault survival strategies such as have been used with thyristors.

SUMMARY OF THE INVENTION

In an AC/DC static power converter including GTO devices as the main switches thereof and controlled to provide a current-source, control is established in response to a critical event such as a DC fault by performing upon each GTO device under conduction an interruption, while controlling for conduction another GTO device not in conduction so as to create a bypass for the fault current. As soon as the fault situation has receded, normal GTO conduction is restored, such another GTO device being concurrently controlled for non-conduction. Freewheeling action is provided between such periods of interruption either with the assist of an auxiliary GTO device, or by controlling for conduction another main GTO device to create therethrough the freewheeling path. Another alternative is to divert energy along an appropriate path toward the AC lines through the bridge during such controlled interruption of conduction.

The invention further provides for GTO control in a DC/AC system to respond to a commutation fault, which control action may also involve the bypassing of fault current between DC and AC lines in either direction. Restoration to normal operation is resumed as soon as a return to normal condition has been detected.

According to another aspect of the invention, the AC/DC, or DC/AC, converter is controlled in response to a DC fault, or commutation fault, so as to readily effectuate a change of converter operation from the rectification mode to the inversion mode, or conversely, depending upon the nature of the critical event: a DC terminal fault, or a commutation fault.

BRIEF DESCRIPTION OF THE DRAWINGS

FIGS. 14A-14H show current and voltage curves illustrating the commutations of the GTO devices of a GTO bridge like in FIG. 4 for the diversionary mode;

DESCRIPTION OF THE PREFERRED EMBODIMENTS

The invention applies to two situations:

1. A current-source AC/DC converter, i.e. a converter operating in the "rectifier mode" from an AC power supply to a DC load;

2. A current-source DC/AC converter, i.e. a converter operating in the "inversion mode" from a DC power supply to an AC load.

Hereinafter, reference will be made to the "rectifier mode" or the "inversion mode" of operation for a converter in the light of these two situations.

It is observed that with a converter normally operating in the "rectifier mode", an unlimited amount of energy is available on the AC side, i.e. the input side, whereas on the DC side, or load side, the energy available is inherently limited. The latter would be, for instance in a motor drive, the energy returned to the AC side when under regeneration in the case of motor braking. Therefore, should a "DC fault" occur on the DC terminals of the load, the AC side might create a dangerous condition for the converter bridge by generating overcurrent therethrough. In contrast, a "commutation failure" occurring between the AC lines of the bridge will not draw any dangerous overcurrent from the limited energy DC side of the "rectifier" bridge.

Considering now a converter operating normally in the "inversion mode", the DC side is now the source of unlimited energy, whereas the load side, or AC line side, normally has limited energy. Therefore, a "DC fault" will not draw an overcurrent from the AC side, whereas a "commutation fault" between the AC lines at the output of the bridge might cause an overcurrent to be drawn through the bridge from the DC lines.

The purpose of the present invention is to protect a converter bridge from the risk of a "DC fault" and/or of a "commutation fault" in either of the abovementioned situations, or both. It is proposed in that regard to choose GTO devices for the converter bridge, rather than thyristors, and to install a control system for the GTO's such that, upon the occurrence of a fault, the converter is by force-commutation forced to either: 1. bypass the current fault safely through a current path involving at least one GTO device, which may be one of the main GTO devices of the bridge, or an auxiliary GTO device provided for freewheeling the energy or for diverting the energy safely through the bridge; or 2. to transfer the converter to the opposite operating mode, rectifier or inversion, depending upon which is the normal operation mode for the converter.

Figure 1:
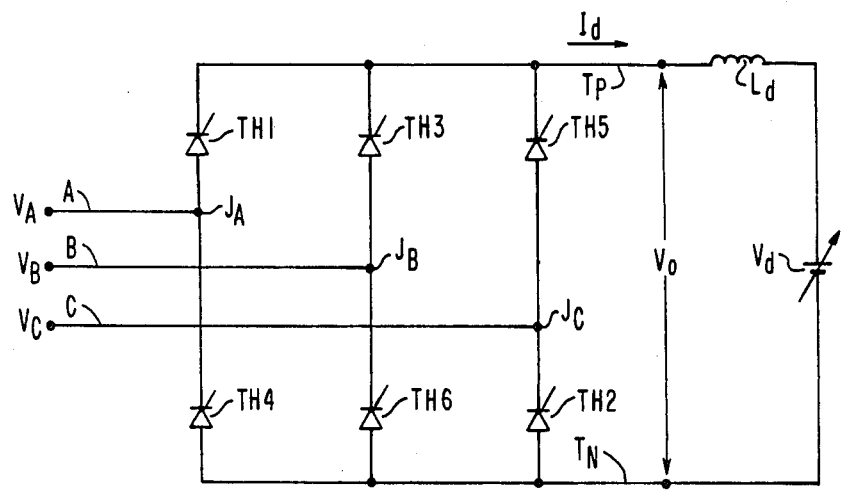
FIG. 1 shows a conventional AC/DC thyristor converter bridge.
Figure 2A:
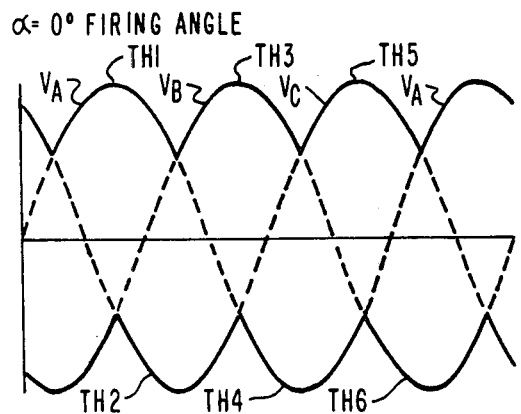
FIGS. 2A-2C illustrate with curves the operation of the bridge of FIG. 1 in the rectifying mode for 0°, 30° and 60° firing angles, respectively.
Figure 2B:
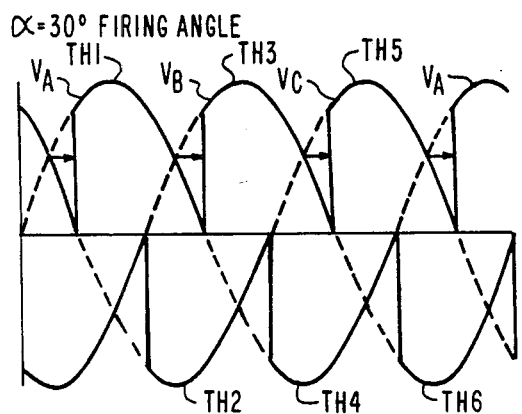
Figure 2C:
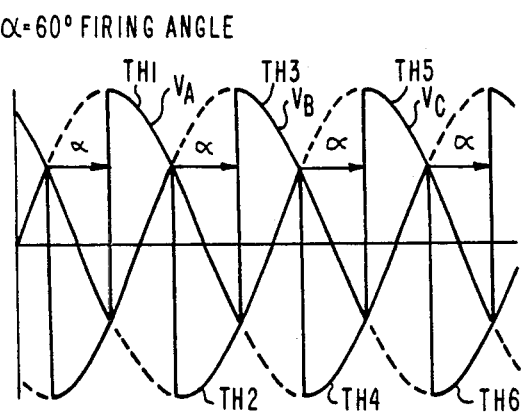
Figure 2D:
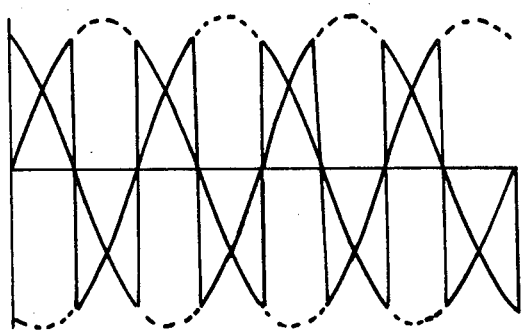
FIGS. 2D-2F illustrate with curves the operation of the bridge of FIG. 1 in the inversion mode for 90°, 120° and 150° firing angles, respectively.
Figure 2E:
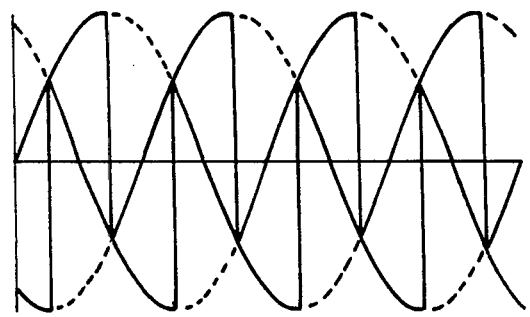
Figure 2F:
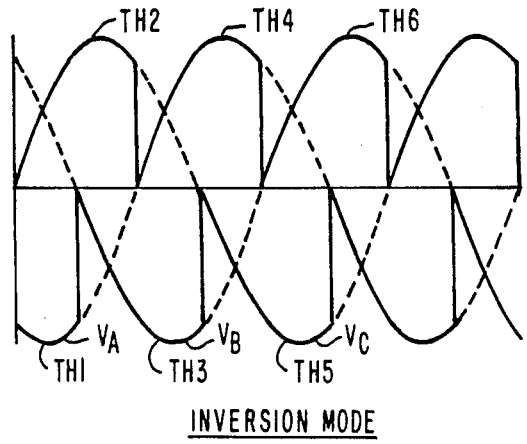
Figure 2G:
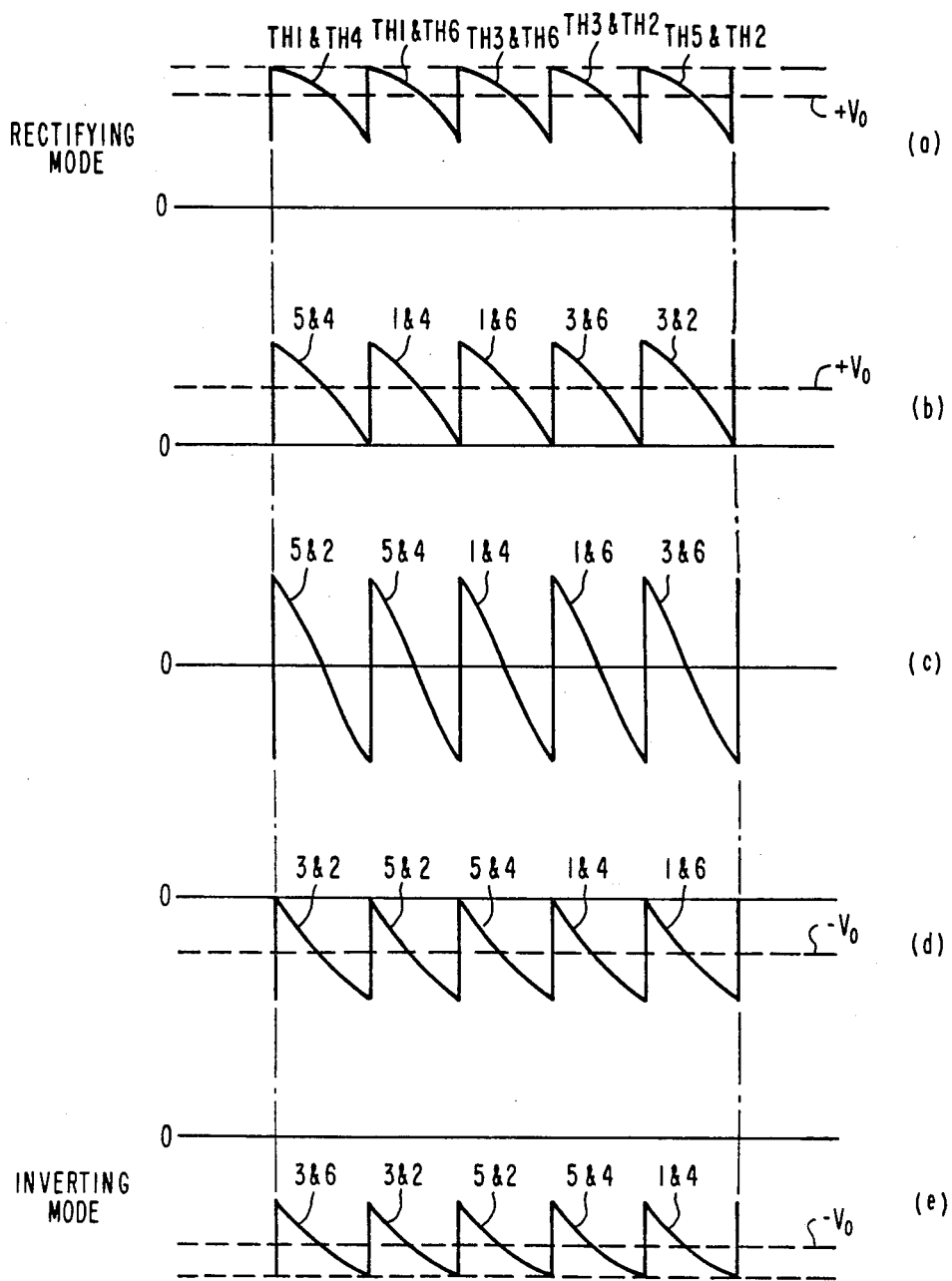
FIG. 2G shows in magnitude and sign the outputted voltage for the two modes of FIGS. 2A-2F.
Figure 3A:
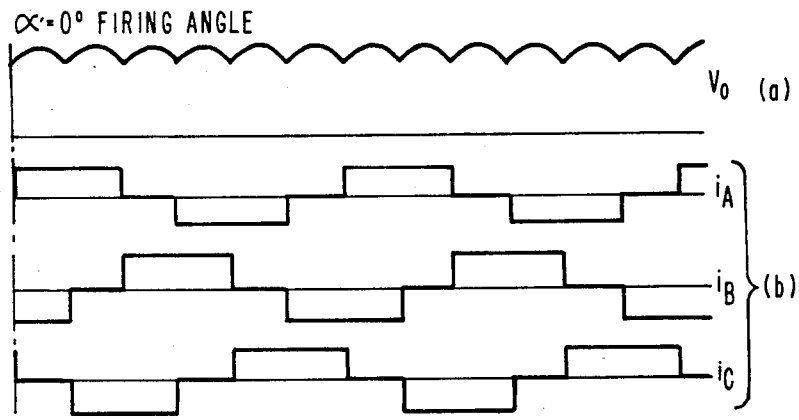
FIG. 3A-3G illustrate with curves the outputted currents and voltage for various firing angles.
Figure 3B:
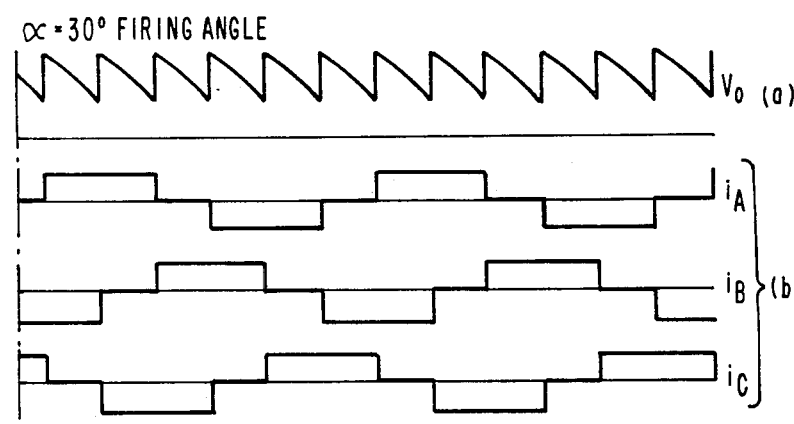
Figure 3C:
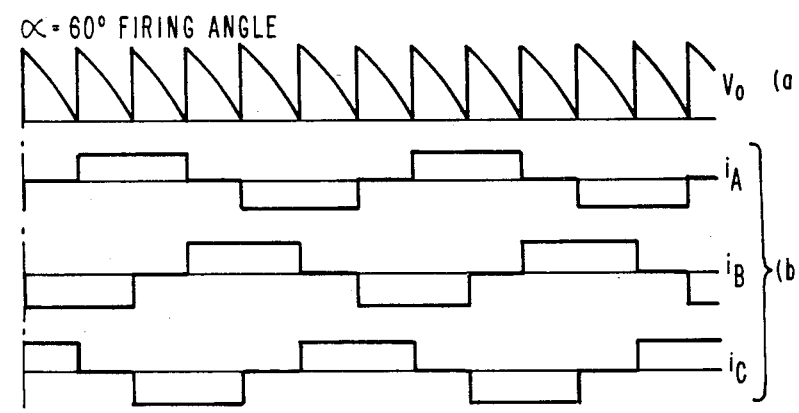
Figure 3D:
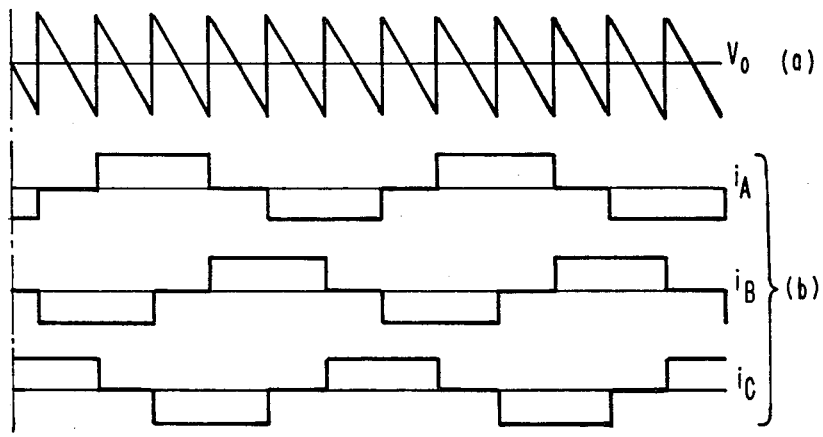
Figure 3E:
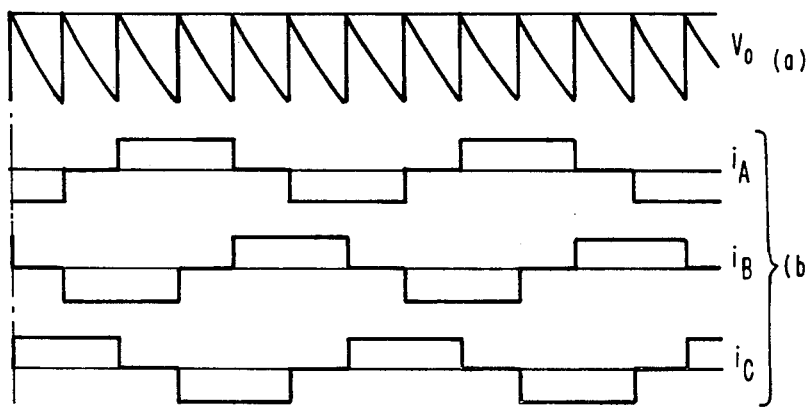
Figure 3F:
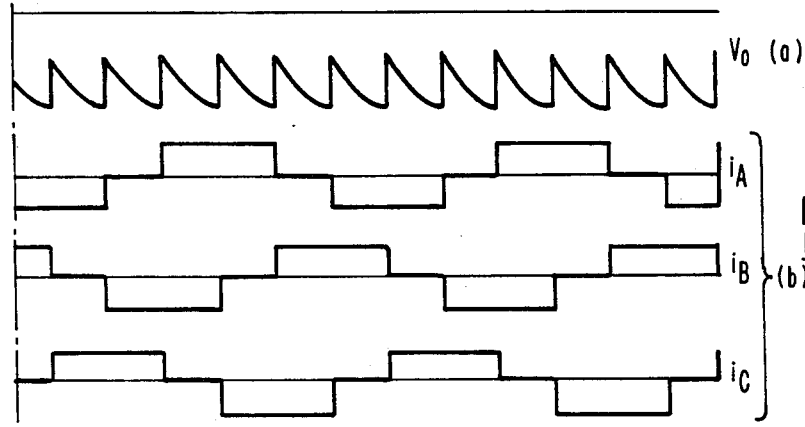
Figure 3G:
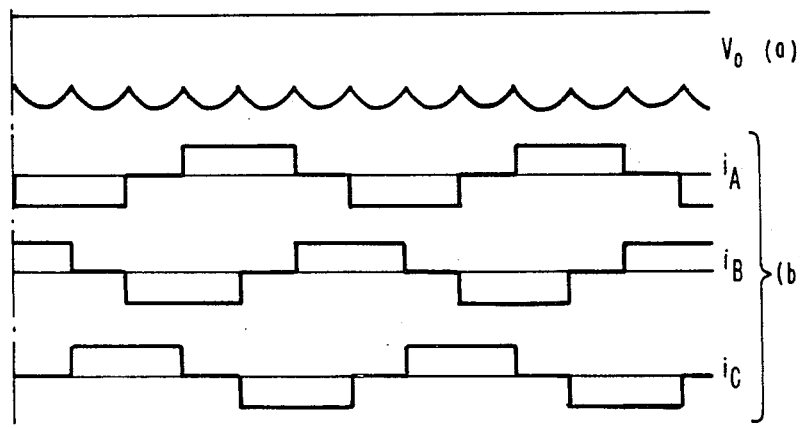

Before describing the GTO bridge and control system according to the present invention, the general operation of a thyristor bridge will be reviewed briefly as follows:

Referring to FIG. 1, a current-source converter of the three-phase thyristor bridge type is illustrated. FIGS. 2A-2C show the operation of the bridge of FIG. 1 in the rectifying mode for firing angles 0°, 30° and 60°; while FIGS. 2D-2F show, for the inversion mode, operation at 90°, 120° and 150°; FIG. 2G shows the respective resulting DC voltages $V_0$. FIGS. 3A-3G illustrate the phase currents $i_A$, $i_B$, $i_C$ in each of such situations.

Referring to FIG. 1, the conventional thyristor bridge includes thyristors $TH_1$-$TH_6$ connected by pairs across DC terminals $T_p$, $T_N$, each pole having nodal points $J_A$, $J_B$, $J_C$ connected to one of the three AC lines A, B, C at voltages $V_A$, $V_B$, $V_C$, respectively. The DC voltage $V_o$ appears across terminal lines $T_P$ and $T_N$.

Considering FIGS. 2A, 2B, 2C relating to 0°, 30° and 60° firing angles, respectively, it is seen that the thyristors $TH_1$-$TH_6$ of FIG. 1 may be fired, i.e. turned-ON, with progressive delays by reference to the associated natural commutation point NC, namely, the intersection between $V_A$ and $V_B$ for $TH_1$, between $V_B$ and $V_C$ for $TH_3$; between $V_C$ and $V_B$ for $TH_2$; between $V_B$ and $V_A$ for $TH_4$, and so on.

Considering FIGS. 2D to 2F in the context of the thyristor bridge of FIG. 1, the firing angles being 90°, 120° and 150°, thyristors $TH_1$, $TH_3$ and $TH_5$ are fired with such a large delay angle that they conduct while following the negative voltage, and conversely for thyristors $TH_2$, $TH_4$, $TH_6$.

FIG. 2G shows the outputted voltage $V_O$ for the respective modes of operation and the respective firing angles of FIGS. 2A-2F.

Referring to FIGS. 3A to 3G, currents $i_A$, $i_B$ and $i_C$ flowing in the current source converter bridge of FIG. 1 are shown in phase relationship, and the outputted DC voltage $V_O$ is shown, as it appears between terminals $T_P$ and $T_N$, for increasing firing angles on the thyristors, namely from 0° to 180° and at 30° from one another.

Figure 4:
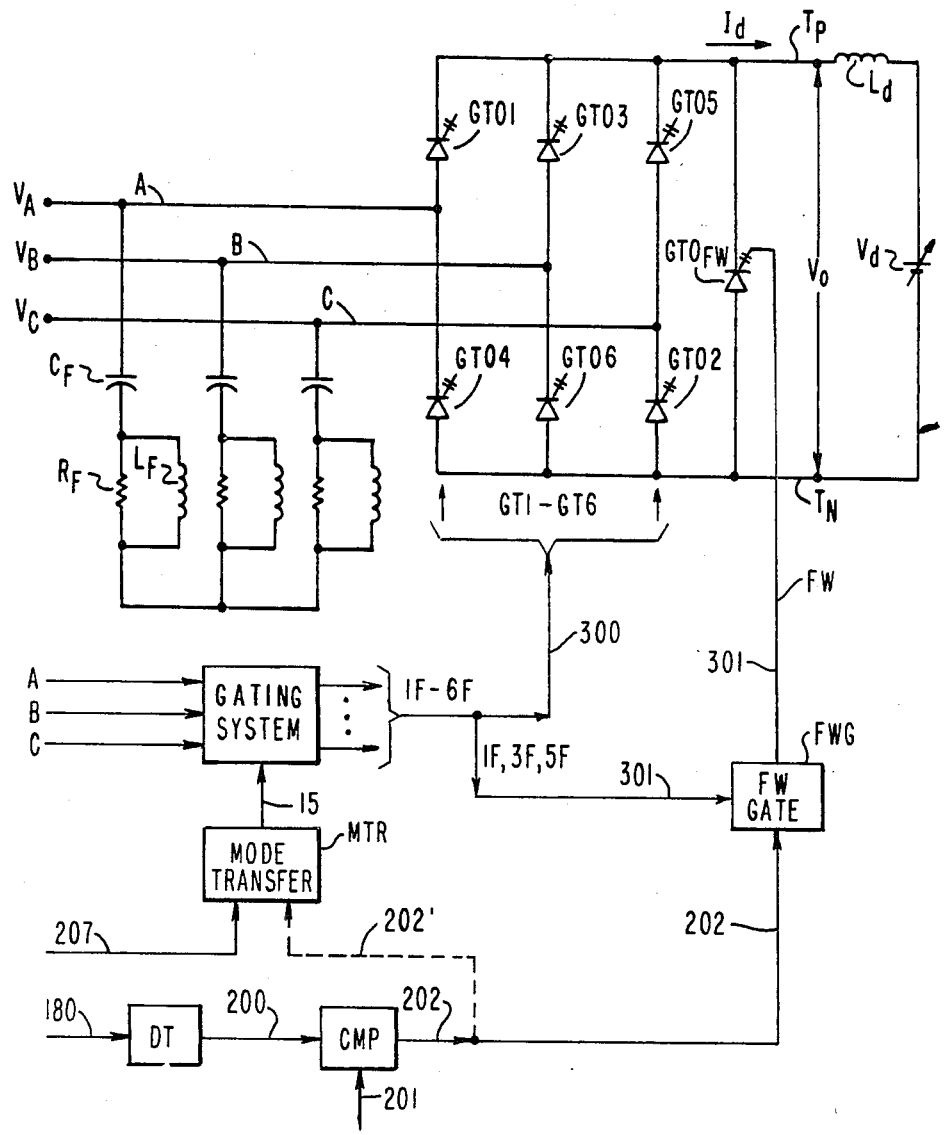
FIG. 4 shows a protection system according to the present invention applied to an AC/DC converter bridge of the GTO type.

FIG. 4 shows the bridge of FIG. 1 in which thyristors $TH_1$-$TH_6$ have been replaced by GTO devices $GTO_1$-$GTO_6$. On the AC side there are AC terminal filters combining harmonic band-pass filters formed with resistor $R_F$, inductor $L_F$ and capacitor $C_F$, as generally known. Between the DC terminals, a freewheel GTO device $GTO_{FW}$ is shown as used according to one embodiment of the invention, as explained hereinafter. Recognizing that the AC source reactance is a major impediment to the implementation of forced-commutation in a current-source converter, a small filter has been shown at the AC terminals to provide low commutating reactance, even though harmonic quality in performance is not of primary concern.

The present invention involves using for fault protection the selective turn-OFF capability of a GTO device in addition to the selective turn-ON capability of the GTO device for the generation of a voltage-controlled current source converter.

Figure 5:
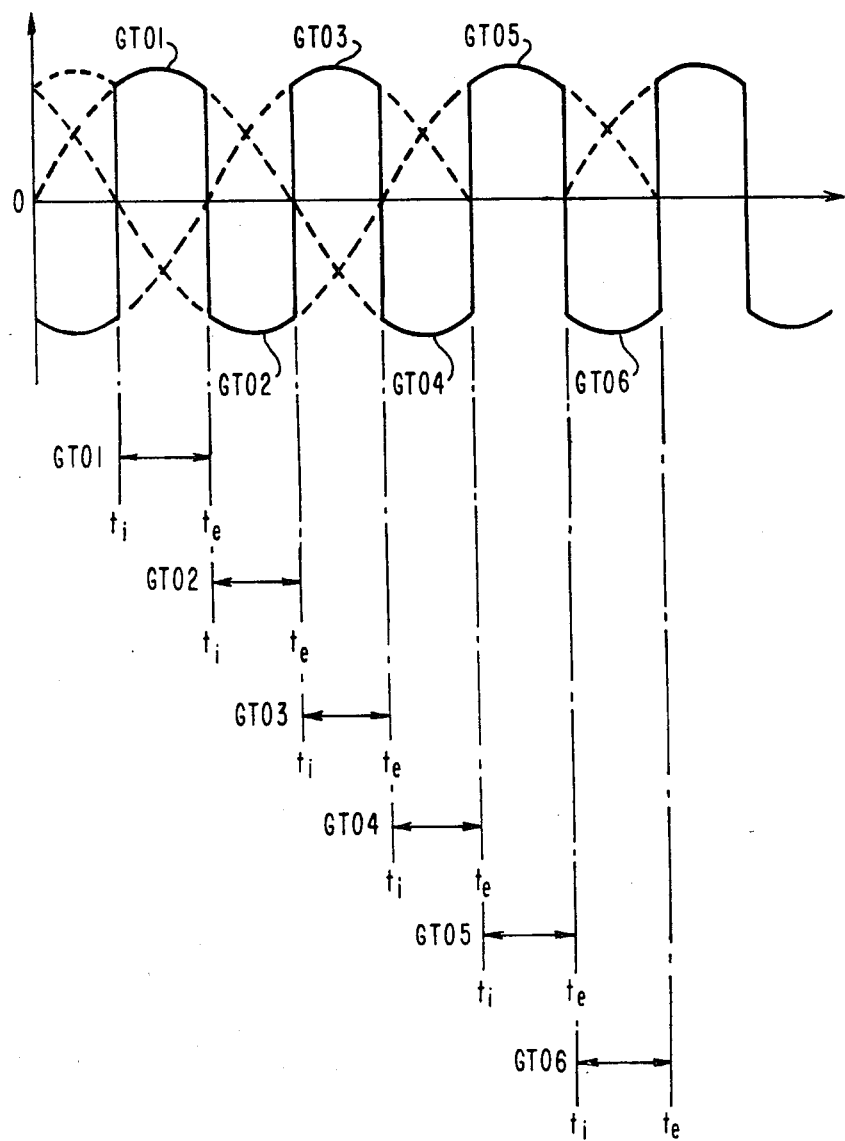
FIG. 5 illustrates with curves the result of a pure transition of control from a thyristor bridge like in FIG. 1 to the GTO bridge by mere sequential firing.

Assuming that thyristors $TH_1$–$TH_6$ are merely replaced by GTO devices, as shown schematically on FIG. 4, and that control is made merely so as to take advantage of the turn-OFF capability of a GTO device, the voltage curves of FIGS. 2A, 2B, 2C, instead of extending "naturally" to the turn-ON instant of the subsequent thyristor for the same DC terminal, can be sunk abruptly. Because the GTO device can be turned OFF at any time at will, such interruption can be made as shown on FIG. 5, namely, at the instant of firing of the subsequent switching device ($TH_2$ in FIGS. 3A–3C) under the firing sequence, i.e. when it is to be turned ON. The result will be an alternative wave of pulses ($GTO_1$, $GTO_2$, $GTO_3$, $GTO_4$ . . . ) of controllable width. This is not a voltage-controlled current source.

In contrast, FIG. 4 relates to a GTO-controlled current-source bridge in which GTO voltage control is provided as exemplified by FIGS. 6A to 6F and FIG. 7. Upon such a normally voltage-controlled GTO system, given as an illustration, is provided according to the present invention a fault protective system illustrated in block diagram on FIG. 4, whereas FIGS. 9, 10, 11, 12, 12A, 18 and 19, hereinafter, constitute a more specific description of FIG. 4. In another context, the technique of gate pulse firing for GTO's has been described in U.S. Pat. No. 4,578,746.

The invention will be described while considering unity power factor as the preferred embodiment (although the ability of turning OFF a GTO on command makes it possible to produce virtually any desired power factor), since unity power factor is the most desirable operative condition in most situations.

There are two basic control philosophies giving rise to a unity power factor. One of them is depicted by the synchrograms of FIGS. 6A–6F relating to the GTO bridge such as shown in FIG. 4. Other topologies are possible.

It is assumed that the main GTO's of the bridge are operated concurrently with an auxiliary GTO device, $GTO_{FW}$, connected across the DC terminals TP and TN, at the output of the bridge when it operates in the "rectifier mode". $V_o$ is the DC voltage at the output. $V_A$, $V_B$, $V_C$ are the AC line voltages at the input. A filter is shown between the phase lines including capacitor $C_F$, resistor $R_F$ and inductor $L_F$ on each branch of a star-connection between the AC lines, as generally known. The current source has a current Id flowing through a reactor Ld and Vd is the voltage across the load. With the freewheel GTO device $GTO_{FW}$ the bridge is voltage-controlled under freewheeling action as will appear from the curves of FIG. 7.

In the "freewheel mode", the GTO's are turned ON at a specific firing angle delay α, with respect to the AC voltages to which they are connected, and are turned OFF again at the same angle, but ahead of the "natural extinction point", i.e. the time for which natural commutation NC would occur in the same circuit, if the devices were diodes. During time intervals when the DC current does not flow in an AC line, it is forced to freewheel between the DC terminals. The conduction path during those intervals may be either via a freewheel device, such as $GTO_{FW}$ shown in dotted line on FIG. 4, or, depending upon the bridge configuration, via specific main GTO devices selected for appropriate paths (such paths being a bypass or a diversionary path) within the bridge. The gist of the present invention is to use the inherent force-commutation feature of such a bridge to provide immediate protection against faults, such as DC fault, or commutation fault, or both.

Figure 6A:
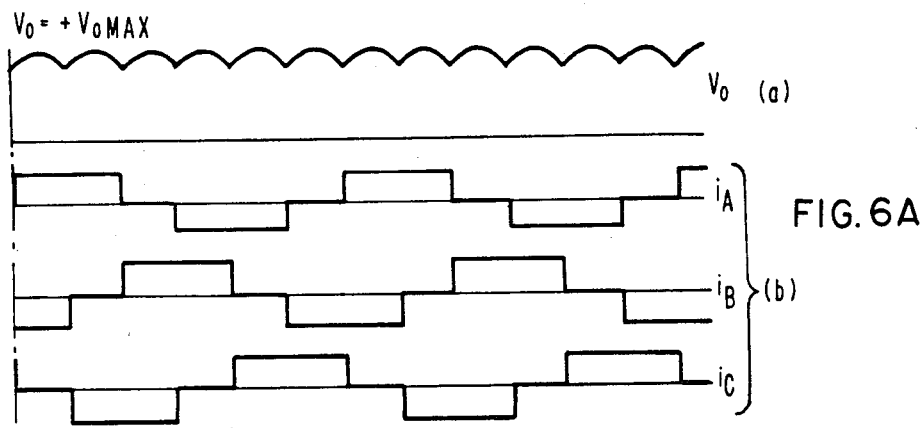
FIGS. 6A-6F are current and voltage curves illustrating for a rectifying mode (FIGS. 6A-6C) and for the inversion mode (FIGS. 6D-6F) varying times of conduction in the voltage control operation of a GTO bridge like in FIG. 4.
Figure 6B:
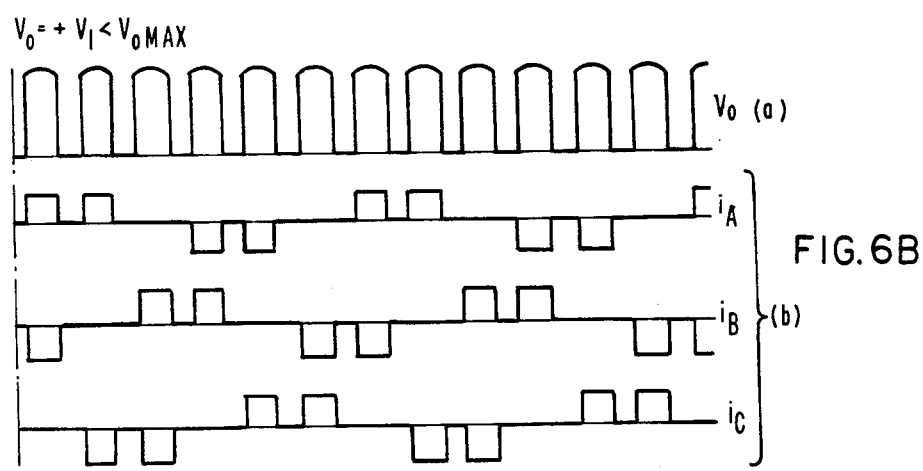
Figure 6C:
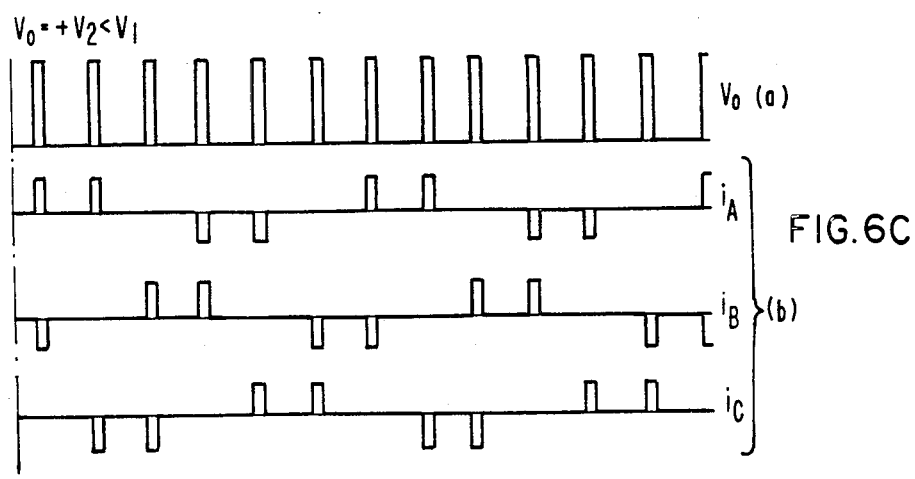
Figure 6D:
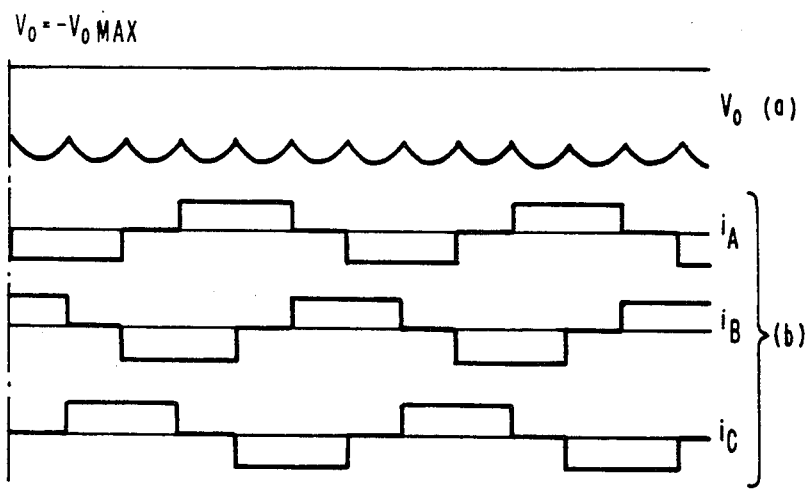
Figure 6E:
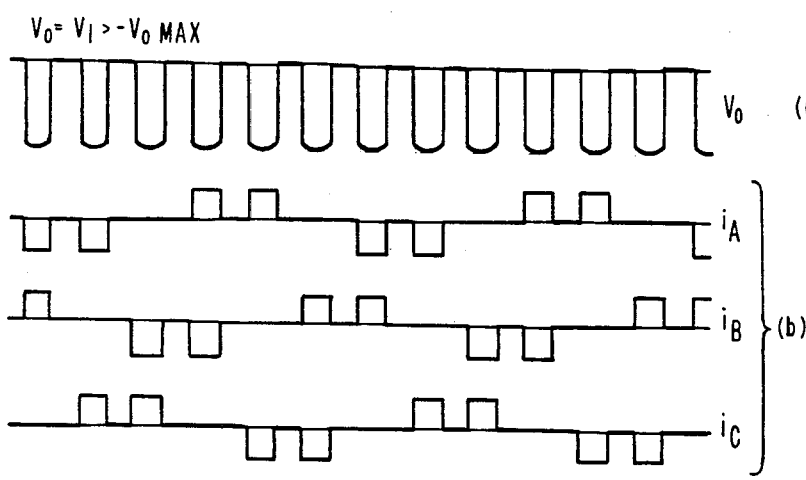
Figure 6F:
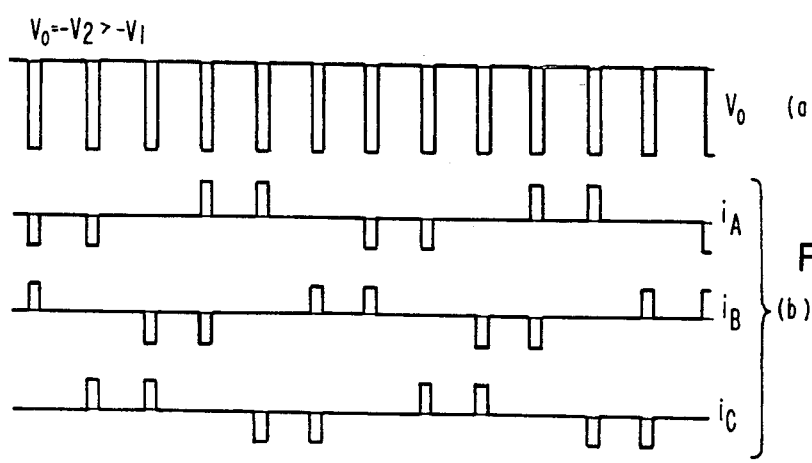
Figure 7:
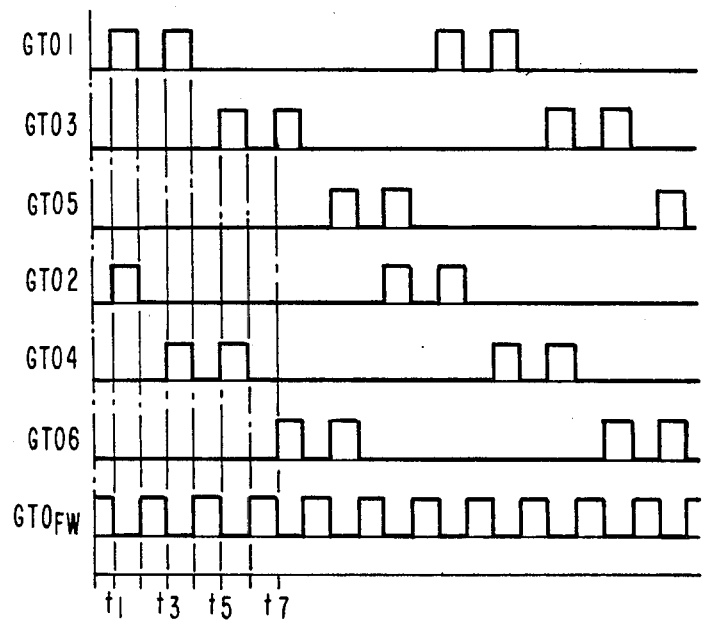
FIG. 7 shows the alternating states of the main GTO devices when an auxiliary freewheeling GTO device is used in the process of FIGS. 6A-6C.
Figure 8:
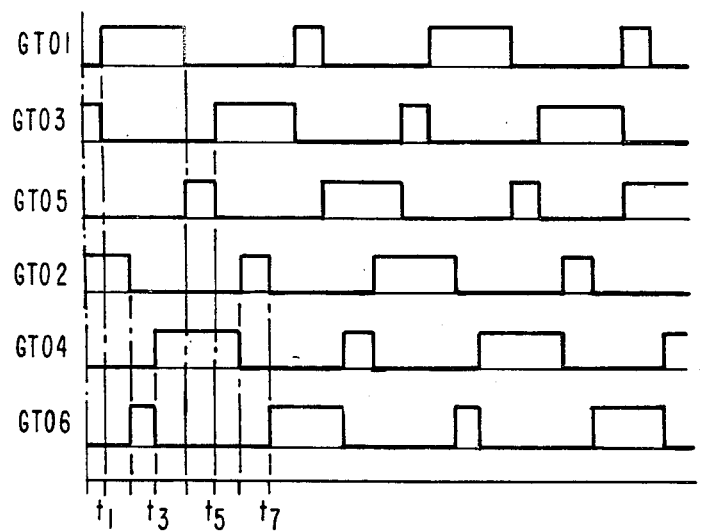
FIG. 8 is like FIG. 7 where instead of an auxiliary GTO device, freewheeling action is effected selectively through main GTO devices.

The device gating sequence, ON and OFF, is depicted for two freewheel situations in FIGS. 7 and 8, respectively. FIGS. 6A to 6F are curves representing the phase line currents $i_A$, $i_B$, $i_C$, with the associated outputted DC voltage $V_o$, for different GTO control conditions, in the case of the freewheel mode of operation of FIG. 7.

Referring again to FIGS. 6A–6F and 7, the GTO control technique used consists in having each "on coming" device of the firing sequence conduct twice, within the normal 120° conducting period of a thyristor, the first conducting period of the on-coming device coinciding with the second conducting period of the off-going GTO device, the two such periods being centered within one of two adjacent 60° periods of the fundamental wave. Voltage and current control are effected by controlling simultaneously the duration of such two conducting periods. Thus, two successive symmetrically disposed conducting time intervals are established for each on-coming GTO device, the second conducting such time interval in the off-going GTO device being in time coincidence with the first such conducting time interval for the on-coming GTO device. Accordingly, the positive portion of current $i_A$ (FIG. 6B) is due to the fact that $GTO_1$ is conducting with $GTO_6$, and that $GTO_1$ is conducting with $GTO_2$, and so on in the overall firing sequence $GTO_1$, $GTO_2$, $GTO_3$, $GTO_4$, $GTO_5$, $GTO_6$. Similarly, the negative portion of $i_A$ is due to the combined condition of $GTO_1$ and $GTO_6$, then to the combination of $GTO_1$ and $GTO_2$ conducting. Similarly for $i_B$ and $i_C$. FIG. 7 shows the succession of the conduction time intervals for $GTO_1$–$GTO_6$.

The simultaneous conduction of two GTO devices across the DC terminals being separated by time intervals of non-conduction, provision is made, as shown by the last curves of FIG. 7, for freewheeling the energy on the DC terminal side through an available freewheel GTO device $GTO_{FW}$, as shown in dotted line on FIG. 4. Conduction of the $GTO_{FW}$ device will be triggered by the off-going GTO device ($GTO_2$ to the extreme left of the curves of FIG. 7) and will be turned OFF by the oncoming GTO device ($GTO_4$ to the extreme left of the curves of FIG. 7). Control of the GTO devices is illustrated in FIGS. 6A–6F in the case of a unity power factor, namely, the conduction periods of GTO device are symmetrically disposed and of same duration each. FIG. 6A shows the situation when the width of the two conduction time intervals is maximum. FIGS. 6B–6C show the width when reduced by steps toward zero. FIGS. 6D–6F are similar curves but corresponding to the inversion mode. Accordingly, $V_o$ is shown varying from a maximum positive value (FIG. 6A), or from a maximum negative value (FIG. 6D), toward zero.

FIG. 4 shows illustratively a protection control system associated with the GTO bridge in accordance with the present invention. Assuming a DC fault, an overcurrent and critical situation takes place which is sensed and by line 180 applied to a detector DT outputting a critical signal on line 200. A comparator CMP having a reference signal applied on line 201 will generate on line 202 a command signal whenever the reference signal is exceeded. The command signal is applied by line 202 to enable a gate circuit FWG which normally blocks the application of the gating signals of the GTO's from line 301. The command signal of line 202 triggers open the gate and allows the gating signals of lines 301 to turn ON the freewheel GTO device $GTO_{FW}$. As a result, conduction of the main GTO's is instantly interrupted (by a gate on the gating lines 300 to the main GTO's not shown) while the auxiliary device $GTO_{FW}$ is bypassing the energy between terminals TP and TN. This means that, considering FIG. 7, if the GTO device GTO1, . . . or GTO6 is non-conducting at such instant of detection, nothing happens until by holding the freewheeling condition the subsequent period of conduction is prevented. If, otherwise, the instant of detection and command signal application occurs while the particular main GTO is conducting, such conduction will immediately become interrupted (by the gate on lines 300, not shown).

Figure 19:
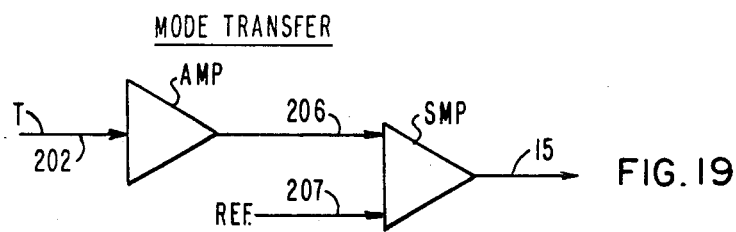

FIG. 4 also assumes that, instead of using the freewheel mode, it is preferred to use a mode transfer. Then, instead of line 202 to the freewheel gate FWG, the command signal goes by line 202' (in dotted line) to a mode transfer circuit MTR. Then, by line 202' the command signal is applied to the mode transfer circuit (as shown in FIG. 19). As a result, the gating system will receive by line 15 a control signal (shown in FIG. 10) which causes the firing angle of the main GTO's to be phase shifted by 180°, thereby to match the required mode of operation (rectifier or inversion)..Conversely, once the fault condition disappears, the command signal of line 202 no longer exists and the mode transfer circuit returns to the normal mode of operation by line 207. The gating system is specifically illustrated in FIGS. 10 and 11 in the context of the voltage control of FIG. 7.

The block diagram of FIG. 4 is more specifically described hereinafter in the context of the present invention as part of a converter between AC and DC, however, the direction of conversion may be the opposite at a given instant. The invention applies to both situations, namely protecting the bridge that a critical event occurs from a DC terminals fault (DC side) or from a commutation fault (AC side), or that it happen when the bridge operates in the rectifying mode, or in the conversion mode. In this regard, it is observed that when there is a DC terminal fault occurring with a bridge operating in the rectifying mode, protection by "bypassing", or by "diversion", as explained hereinafter will prevent consequences from being felt by the system. Therefore, transfer from the rectifying to the inversion mode would be in order if the system on the AC side would accept such consequences. Conversely, with a bridge operating in the inversion mode and affected suddenly by commutation failure, transfer to the rectifying mode according to the invention will not protect the system from consequences occurring as a result of an ensuing DC terminal fault. Therefore, one can rely on the other aspect of the invention namely protection by causing a "bypass" of overcurrent, as explained hereinafter. Therefore, the present invention in its broad aspect involves a control system which carries both protection so that upon a DC fault, or a commutation fault, it will perform protection (1) by causing a bypass to build up or (2) by causing a transfer to the opposite operating mode, the choice upon such occurrences by the control system depending upon which mode (inversion, or rectification) is existing upon the occurrence of the fault, and upon which type of fault (DC fault, or commutation fault) is being detected.

To summarize, with an AC/DC converter (rectifying mode) bridge coupled by its DC output terminals to a load, the risk run by the bridge of switching devices is of a short-circuit occurring on the DC lines, of a failure of the load. In this situation, the invention involves GTO's as the switches and the bridge is protected against such critical event, by bypassing the fault current through either freewheeling GTO's (via a special freewheel GTO device, or via another GTO device of the bridge) or, by a diversionary GTO path buildup through the bridge.

If the bridge to be protected is an inverter bridge (DC/AC conversion) there is no risk from a DC fault for the bridge because the load is on the AC terminals side, whereas the DC lines are at the input coming from a current source, not coupled to a load. In this situation, the risk is "commutation failure" caused by the AC load. According to the other aspect of the invention, provision is made to protect the inverter bridge against such eventuality. However, unless protection exists, commutation failure might lead to a short circuit between the DC lines of the input as well. Then, the first aspect of the present invention will apply.

Conversely, commutation failure protection installed on an inverter bridge according to the invention would be beneficial, whereas when installed on a rectifier bridge it would be useless. However, similarly, DC fault could occur as a result of commutation failure from the AC side, thus, upon the DC terminals to the load of the rectifier bridge. The first aspect of the invention is then, again, in order.

If there is a DC fault, this will appear as an overcurrent which will be sensed as an indication of the fault.

If there is a commutation fault, this may be due (1) to a fault between AC lines, (2) a faulty gating or (3) a fault switch in the bridge. The last of these three possibilities (case #3) is not to be corrected merely by control. The invention applies to the two other eventualities. Detection of the critical event will be effected as generally known by measuring an anomalous voltage between the AC lines (case #1) or by observing a wrongful sequence in the firing sequence (case #2). In response to a detection of overcurrent (DC fault), of a critical AC voltage on the AC lines (case #1 of a commutation fault), or of an anomalous firing (case #2 of a commutation fault), the protection system according to the present invention takes advantages of the forced commutation technique used in a GTO gating circuit bridge (thus, without there course to expensive force - commutation auxiliary circuitry) to provoke immediately a current path (by bypass or diversion) or a transfer of operating mode to protect the converter.

Figure 4A:
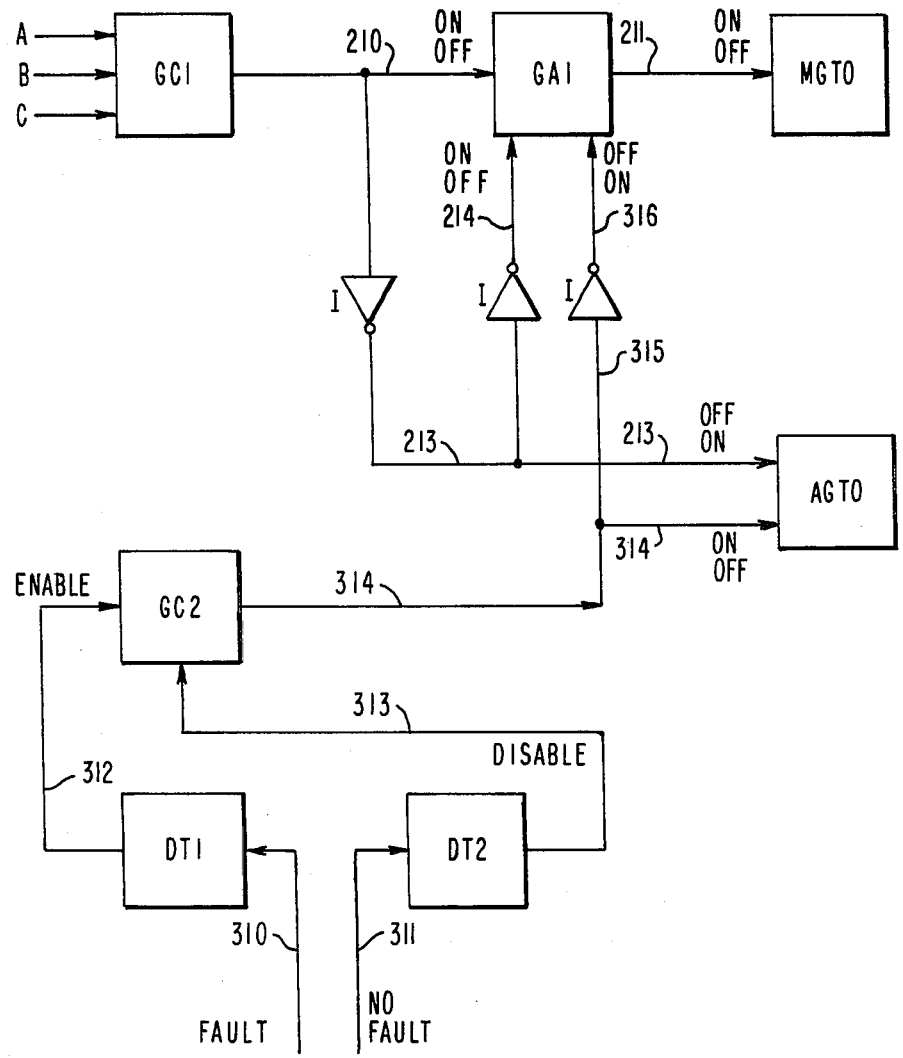
FIG. 4A is a block diagram illustrating another protection system according to the invention.

FIG. 4A is a block diagram of a control system for a GTO bridge like the one in FIG. 4 where the main switches are identified as MGTO and the auxiliary GTO switches, like $GTO_{FW}$ in FIG. 4, are identified as AGTO. A gating circuit GC1 for the main switches (MGTO) and the auxiliary switches (AGTO) is like described hereinafter by reference to FIGS. 6A-6F, FIG. 7, or FIG. 8, or like described in the aforementioned U.S. Pat. No. 4,578,746. Accordingly, when the gating pulse on line 210 at the output of GC1 is high, a gate GA1 is enabled by lines 212, 213 and 214 to pass a signal high on line 211 to turn ON the particular MGTO in the firing sequence. At the same time lines 210 and 212 after inversion onto line 213 cause the auxiliary switch AGTO to be turned OFF. Line 213 after inversion onto line 214 enables gate GA1 to pass the signal of line 210 onto line 211. The auxiliary switch AGTO may be, as explained hereinafter, a freewheel device like $GTO_{FW}$ across the DC terminals, or another GTO device of the bridge used as a freewheel device within the bridge, or it may be another GTO device of the bridge use as in a diversionary path, across the bridge rather than a bypass as in the two freewheel situations.

If there is a fault detected from line 310 by detector DT1, a command signal on line 312 will cause another gating pulse generating circuit GC2 to apply by line 314 a gating signal turning ON the AGTO switch. When this occurs, by line 315 after inversion onto line 316, gating circuit GA1 is disabled, thereby turning OFF the MGTO which is ON under circuit GC1, or preventing the oncoming MGTO from being turned ON.

As soon as the fault has subsided, this is detected by detector DT2 and on line 312 is applied a disabling command signal for circuit GC2. Therefore, on line 314 the gating command is to turn OFF the auxiliary switch AGTO. At the same time by lines 315 and 316, gate GA1 is enabled, so that normal operation by gating circuit GC1 for both MGTO and AGTO switches is resumed.

Figure 9:
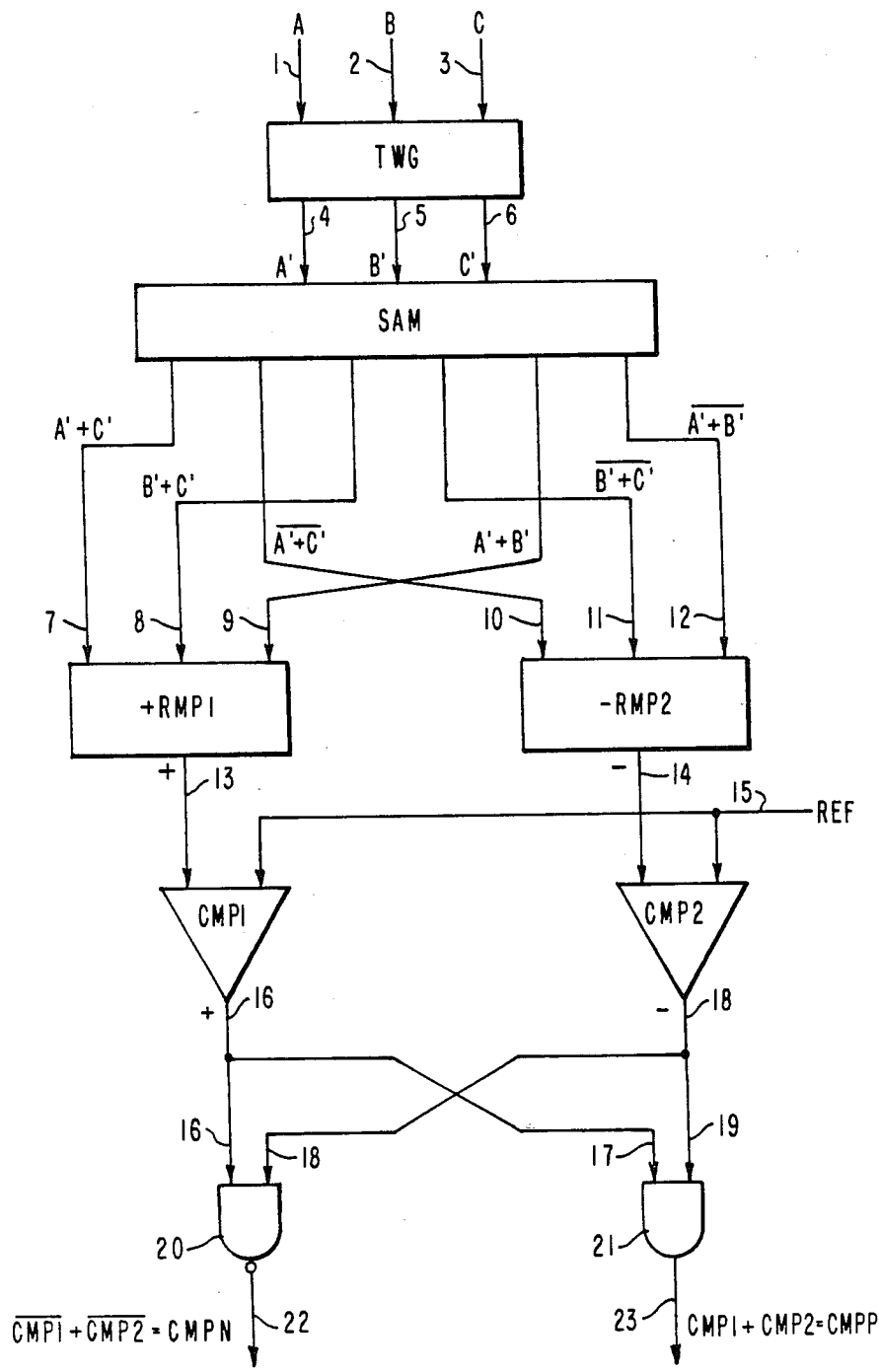
FIGS. 9-12 and 12A, illustrate the implementation of a control system with an additional freewheel device such as $GTO_{FW}$ in FIG. 4, and like in FIG. 7.
Figure 11:
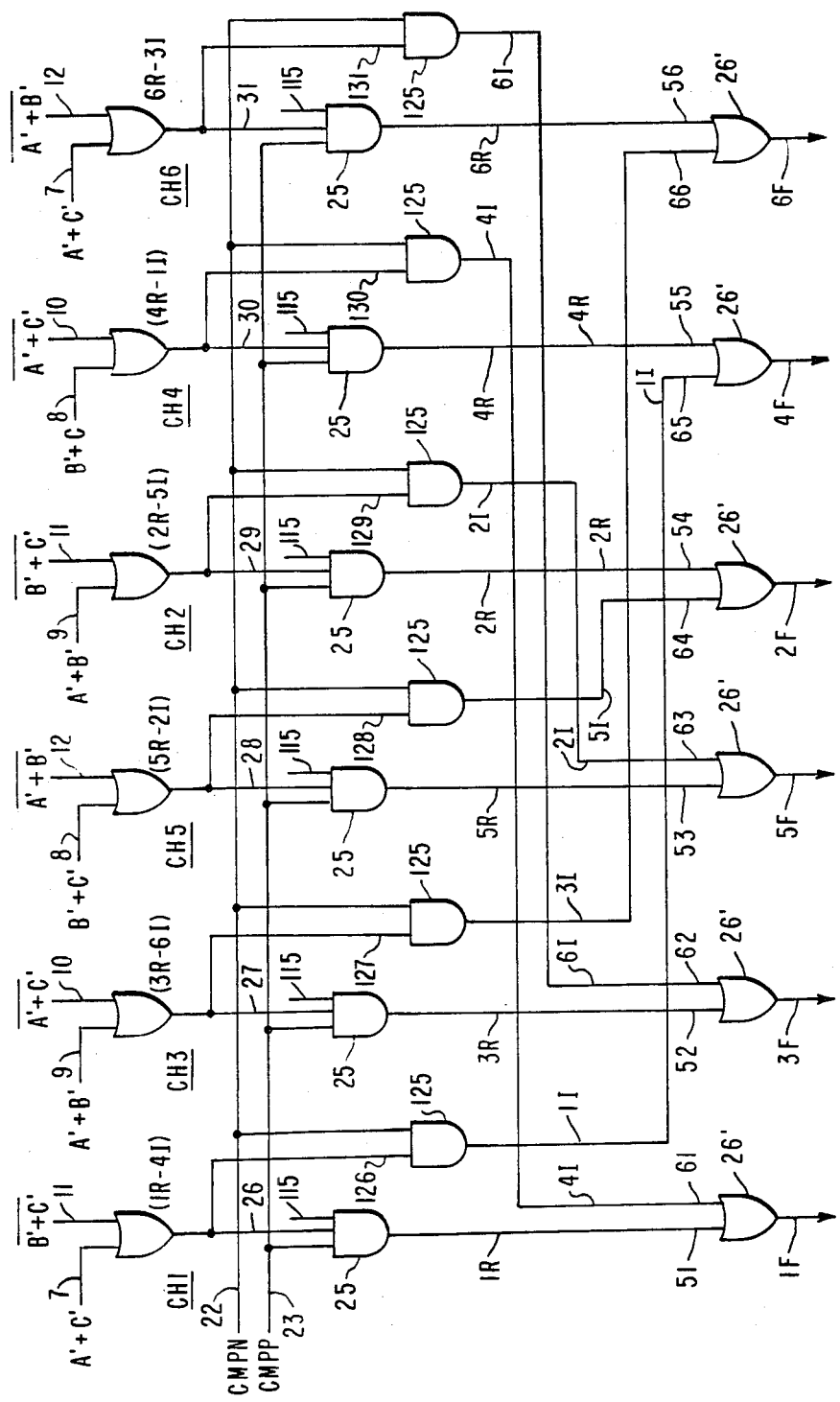
Figure 12:
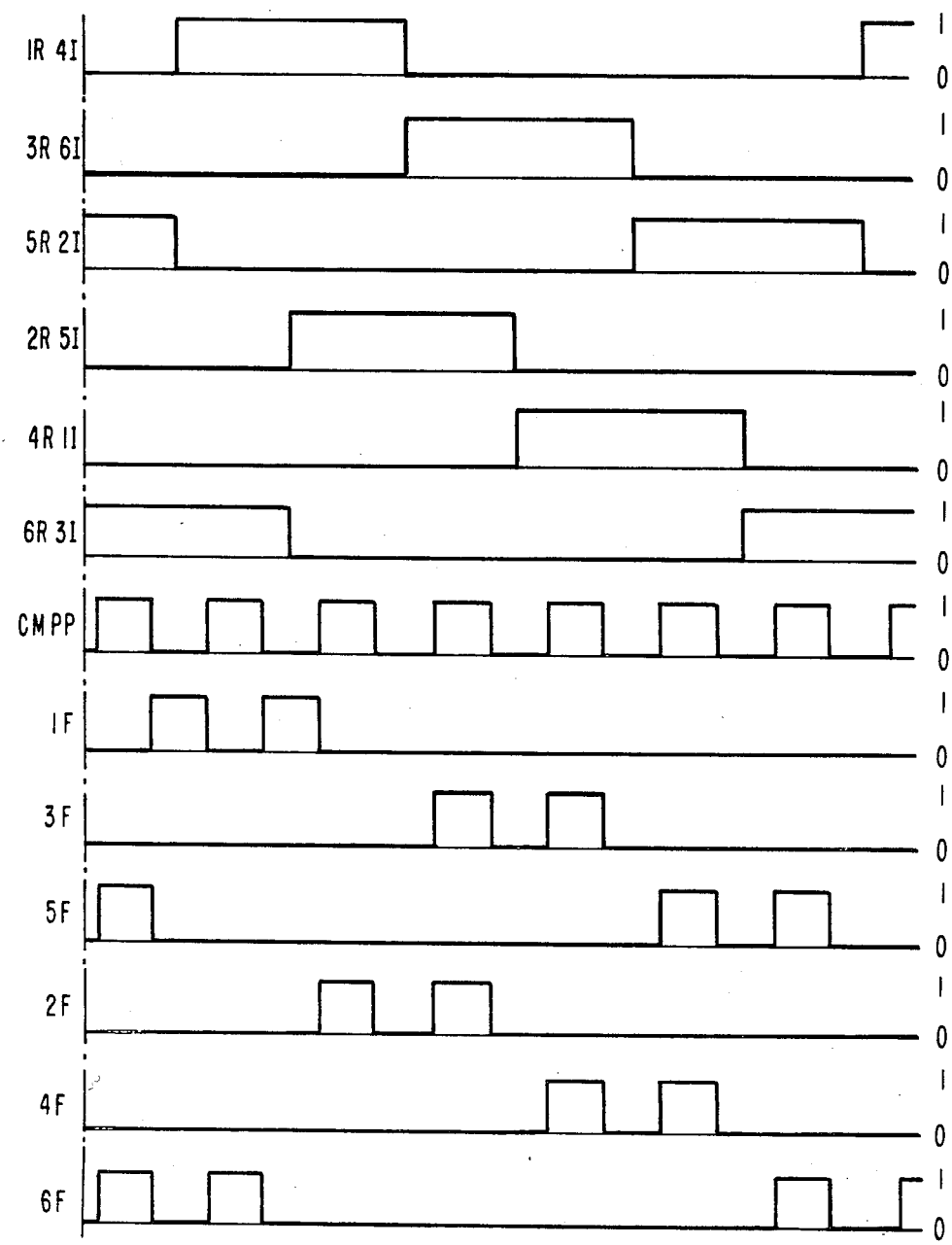
Figure 12A:
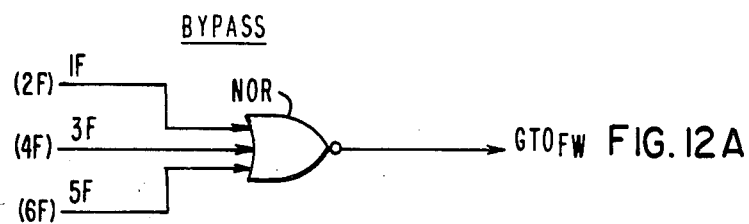

Referring to FIGS. 9, 11 and 12A, block diagrams are given as an illustration of the internal organization of the control system of FIG. 4 establishing the times of conduction of the GTO's of the bridge according to the scheme of FIG. 7.

Figure 10:
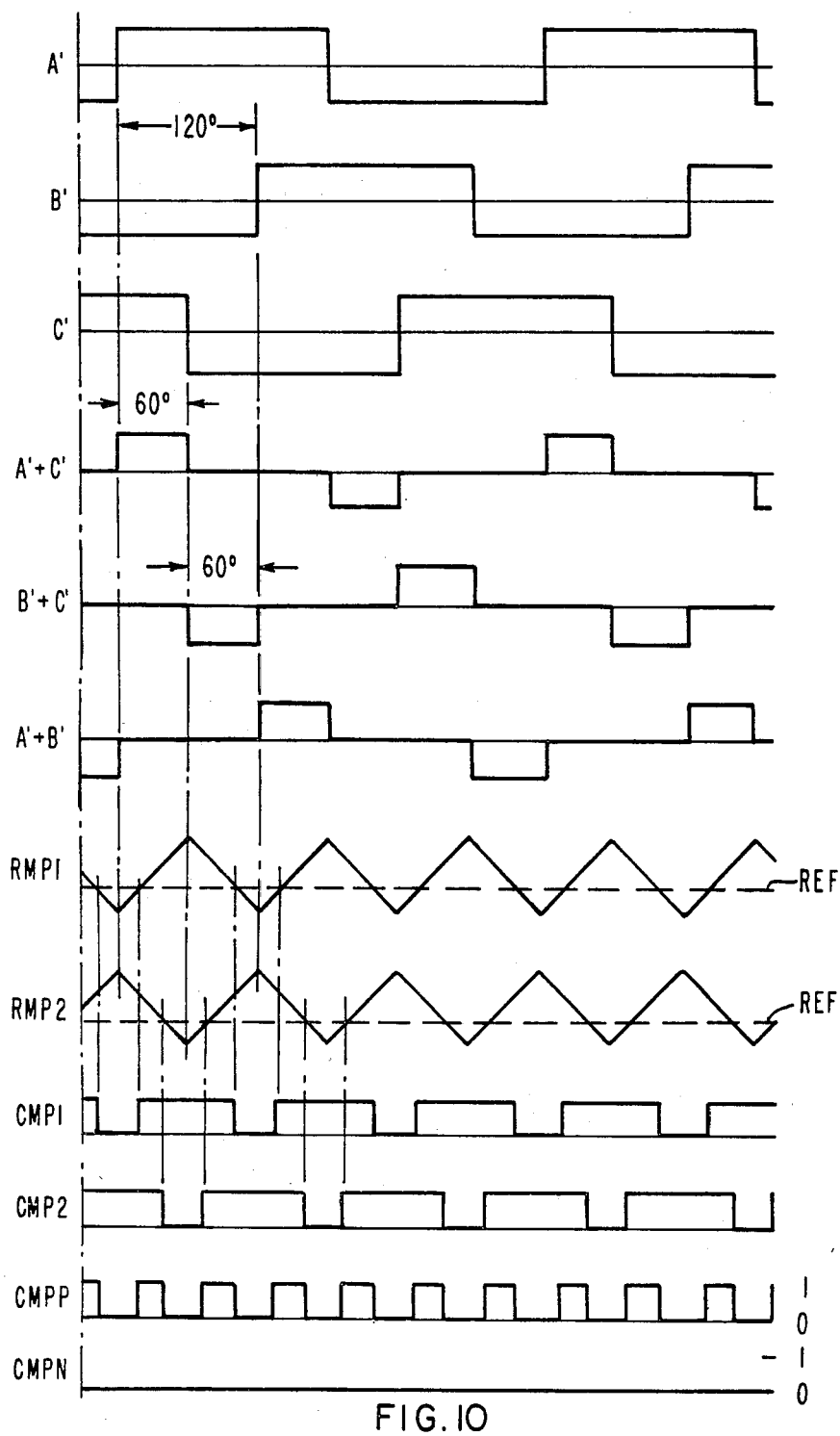

In order to generate conduction states as shown in FIG. 7, each of the main GTO devices is to be fired and interrupted twice in the GTO sequence. Two controlled time intervals are defined such as to be inscribed within two adjacent 60° periods of the fundamental. FIG. 9 shows a time wave generator TWG responding to signals on lines 1, 2, 3 representing the respective AC line voltages, and outputting on lines 4, 5, 6 three square wave time wave references A', B', C', as shown in FIG. 10. Consecutive falling and rising edges define the aforementioned 60° periods, and these are expressed logically by summing the following pairs: (A'+C') on line 7; (B'+C') on line 8; (A'+B') on line 9; $\overline{(A'+C')}$ on line 10; $\overline{(B'+C')}$ on line 11; and $\overline{(A'+B')}$ on line 12. These signals are obtained, as generally known, from a summer amplifier circuit SAM. Positive and negative ramps which characterize two alternative and consecutive periods of 60° per GTO device are obtained for the rectification mode of operation with a comparator CMP1 responsive to lines 7, 8, and 9 which correspond to the direct values of logic signals (A'+C'), (B'+C') and (A'+B'). For the inversion mode of operation, another comparator CMP2 is responsive to lines 10, 11, 12 which relate to the inverted logic signals $\overline{(A'+C')}$, $\overline{(B'+C')}$ and $\overline{(A'+B')}$.

The signal outputted by CMP1 on line 16 is CMP1 as shown on FIG. 10, and the signal outputted by CMP2 on line 18 is CMP2 shown on FIG. 10. The rising edge of signal CMP1 shows the instant of firing within the first 60° period, the falling edge shows the instant of turning OFF for the same period, whereas signal CMP2 shows the turn ON and turn OFF instants for the same GTO within the second period of 60° thereof.

The signals of lines 16 and line 18 are applied by lines 17 and 19, respectively to an AND device 21 which recognizes the logic (CMP1+CMP2) for the rectification mode in signal CMPP of FIG. 10. Simiarly, the signals of lines 16 and 18 are applied to a NAND device 20 which recognizes the logic $\overline{(\overline{CMP1}+\overline{CMP2})}$ for the rectification mode in the signal CMPN shown to be zero all the way when in the rectification mode. The logic significance of CMPP and CMPN would be reversed in the inversion mode, CMPP being in such case all the time zero. Accordingly, CMPP is effective in the rectifying mode, whereas CMPN becomes effective in the inversion mode. It remains to use the logic of these two signals, CMPP on line 23 and CMPN on line 22, to apply to the proper GTO in the firing sequence time periods of conduction as illustrated in FIG. 7 and as generated on line 22, or 23 of FIG. 9.

Considering GTO device GTO1 to which is applied a logic pulse IF defining its conduction, (i.e. turned ON, then turned OFF, according to FIG. 7) this signal is according to signal IR of line 51 in the rectifying mode of operation, or (OR device 26) according to signal of line 1I of line 61 in the inversion mode of operation.

When in the rectifying mode, for instance, signal IR is outputted over onto line 51 as a ONE by AND device 25, such signal CMPP of line 23 is a ONE (as shown in FIG. 10 for this mode) and channel #1 CH1 brings onto line 26 a ONE. (An OR device responds to (A'+C') by line 7 for the first 60° period, then to $\overline{(B'+C')}$ by line 11 for the second 60° period.)

When in the inversion mode, CMPN becomes the active line on line 22 onto the AND devices 125 rather than line 23 and the AND devices 25. In the inversion mode, for instance, GTO device GTO1 responds to (A'+C') from line 10 and to channel #4, or (B'+C') on line 8 for the same channel, thus defining the two successive periods of conduction.

FIG. 11 shows a similar logic relationship for each of the other GTO controlling signals 3F, 5F, 2F, 4F, and 6F (which are associated to GTO devices GTO3, GTO5, GTO2, GTO4 and GTO6, respectively) which, through OR devices 26, receive either the logic of lines 52, 53, 54, 55 and 56, respectively, for the rectifying mode, or the logic of lines 62, 63, 64, 65 and 66, respectively, for the inversion mode. Channel #3 responds through OR device 70 to the logic signal (A'+B'), or $\overline{(A'+C')}$; channel #5 responds to (B'+C'), or $\overline{(A'+B')}$; channel #2 responds to (A'+B') or $\overline{(B'+C')}$; channel #4 responds to (B'+C') or $\overline{(A'+C')}$; and channel #6 responds to (A'+C') or $\overline{(A'+B')}$.

Signals 1R, 3R, 5R, 2R, 4R and 6R from AND device 25 correspond to channels #1, 3, 5, 2, 4 and 6, whereas signals 1I, 3I, 5I, 2I, 4I and 6I relate to channels CH4, CH6, CH2, CH5, CH1 and CH3, respectively.

Referring to FIG. 12 signals 1R-6R and 1I-6I, as well as 1F-6F, are shown in timing relationship with signal CMPP.

Whenever one main GTO device is turned OFF, as shown in FIG. 7, the freewheel $GTO_{FW}$ is turned ON and when another main GTO device is turned ON, the freewheel $GTO_{FW}$ is turned OFF. This function requires only a combination of three signals (1F, 3F, 5F), or (2F, 4F, 6F). As shown in FIG. 12A, adding a NOR device to such a combination of signal will provide a signal FW on the controlling line for the gating circuit of GTO device $GTO_{FW}$.

Figure 13:
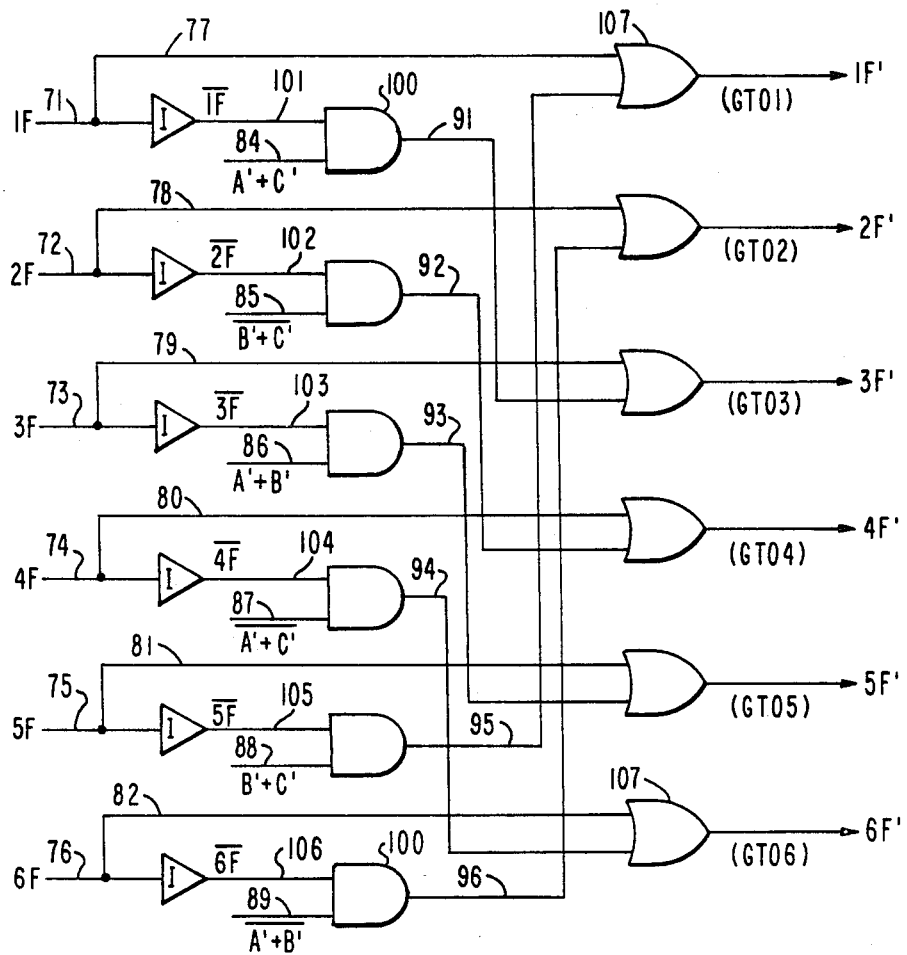
FIG. 13 is a modification of FIGS. 9-12 and 12A when the implementation of the control system is like in FIG. 8, i.e. using one main GTO device for freewheeling.

It will be assumed now, that freewheeling is done through the main GTO devices of the bridge, like in FIG. 8, rather than through an auxiliary freewheel GTO device. How the signals 1F-6F of FIG. 12 are handled, rather than like in FIG. 12A, is shown in FIG. 13. While 1F-6F are still controlling the gating circuit of GTO1-GTO6 according to the periods of conduction shown in FIG. 7, signals 1F'–6F' are derived which will relatively control GTO1–GTO6, respectively, for freewheeling conduction.

Signals 1F–6F are fed on respective lines 71–76, each to an inverting logic circuit I which leads to lines 101–106, respectively inputted to respective AND devices 100. Logic signals $(A'+C')$; $\overline{(B'+C')}$; $(A'+B')$; $\overline{(A'+C')}$; $(B'+C')$; and $\overline{(A'+B')}$ are inputted by respective lines 84–89 as second inputs each to a corresponding AND device 100 so as to match signals 101–106, respectively, via OR device 107 for 1F'; device GTO1 is responsive to lines 71 and 77 in the rectifying mode, to line 95 from AND device 100 in the inversion mode. Similarly, (GTO2 and 2F') respond to lines 72 and 78 in the rectifying mode, or to line 96 in the inverting mode; (GTO3, 3F') are associated to lines 73, and 79, or line 91; (GTO4, 4F') to lines 74 and 80, or line 92; (GTO5, 5F') to lines 75 and 81, or line 93; and (GTO6, 6F') to lines 76 and 82, or line 94.

FIGS. 14A–14H show synchrograms for a second mode of operation called the "diversionary" mode. As it appears, the DC current may not always be freewheeled at the converter's DC terminals, but, rather, it is directed into another AC line in such a way and for such periods as to maintain unity (or other desired) power factor. The gating sequences for the GTO's in the situation of FIGS. 14A–14H are shown in FIGS. 15A–15C. This "diversionary" mode, though, may be found in certain situations less desirable than the freewheel mode, because it tends to create higher amplitude harmonic currents in the AC lines. For either of the aforementioned operating modes, an increase in switching rate will improve the spectrum of current harmonics upon the AC lines. FIGS. 15A, 15B and 15C show the states of conduction of the GTO's for maximum voltage, and for two different smaller voltages.

Figure 14A:
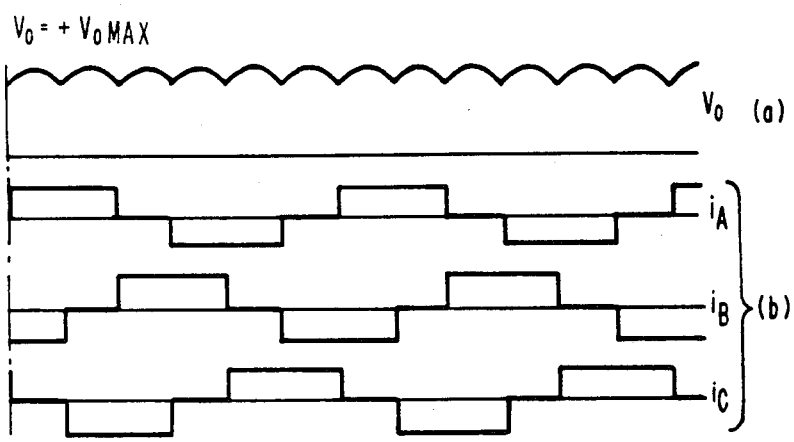
Figure 14B:
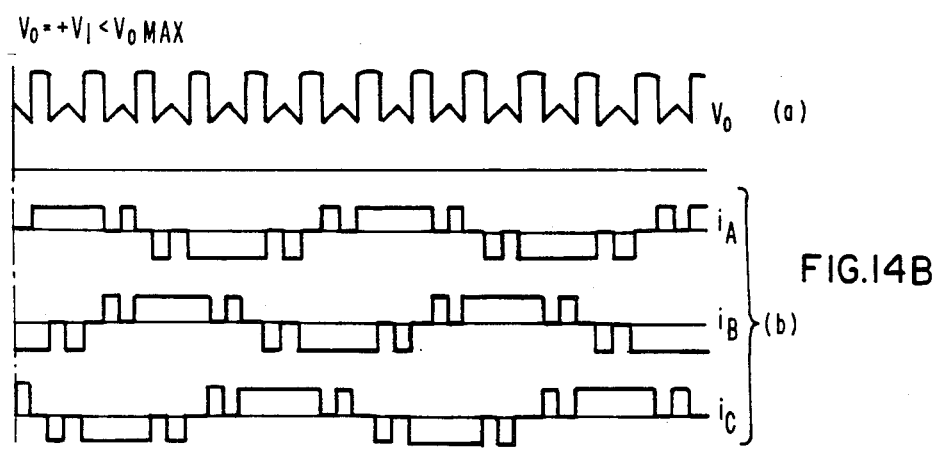
Figure 15A:
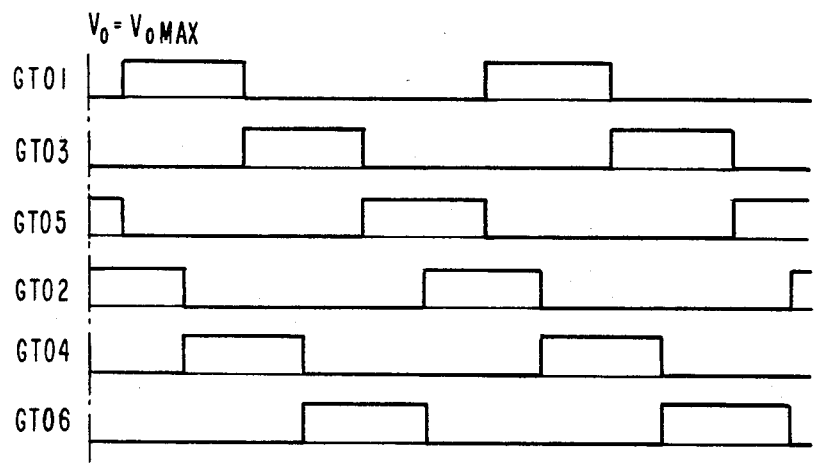
FIGS. 15A-15C provide curves showing the conduction states of the GTO devices used in a diversionary mode, for three different output voltages, respectively.
Figure 15B:
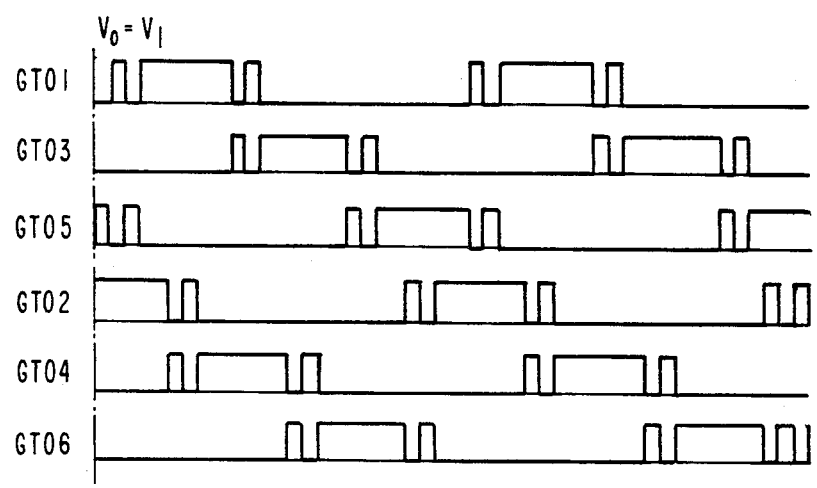
Figure 15C:
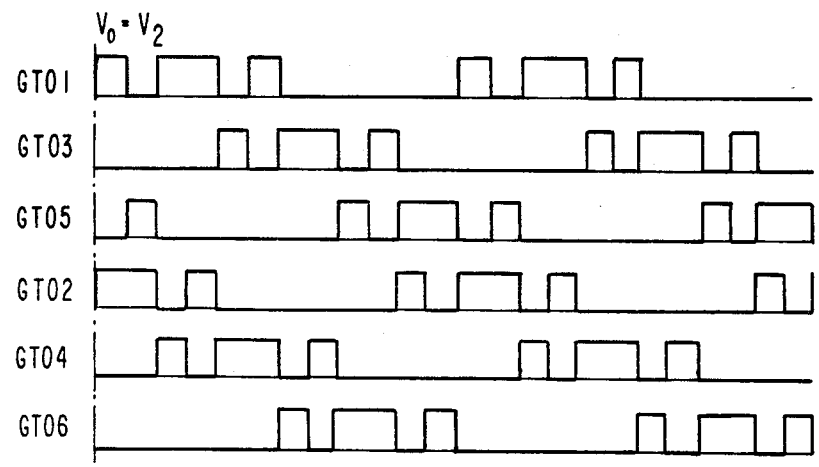

Considering the outputted currents of FIG. 14B, where the output voltage $V_0$ is $V_1$ smaller than the maximum voltage, as shown in FIG. 15B where the conduction of the GTO's is illustrated, GTO1 and GTO4 are both conducting. When GTO1 is being turned OFF, the on-coming GTO device GTO3 is turned ON at the same time, but just enough to conduct with GTO4. Then, GTO1 is turned ON again while GTO3 is being turned OFF. After that, GTO3 is turned ON definitely while GTO1 is being turned OFF definitely. The same will be done for GTO4 when it is time for GTO6 to be turned ON and to take its place, GTO4 and GTO6 going back and forth, just before GTO6 takes over, and GTO6 going back and forth, just before GTO6 takes over, and GTO4 ceases to operate until its next turn. It appears that there is a head and tail period of ON and OFF conditions between the two GTO's which are being commutated on the same polarity side. The effects on the voltage $V_0$ and the phase currents $i_A$, $i_B$, $i_C$ are shown in FIG. 14B.

Figure 14C:
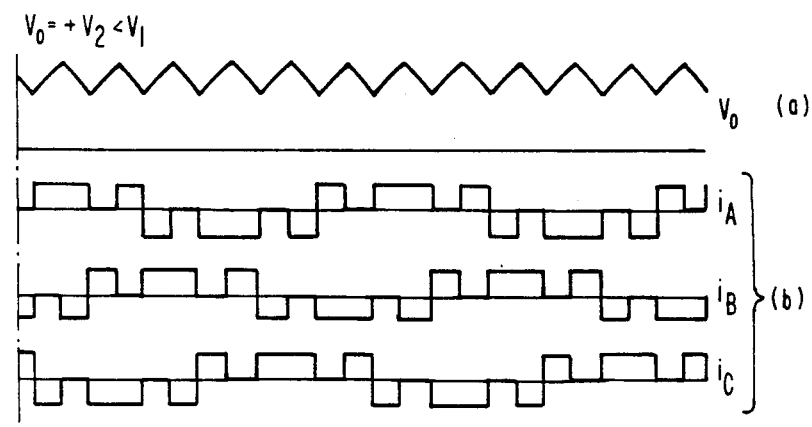
Figure 14D:
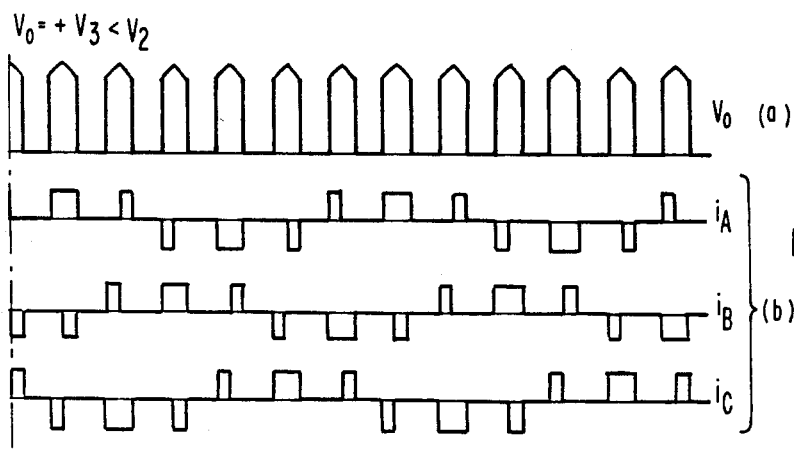
Figure 14E:
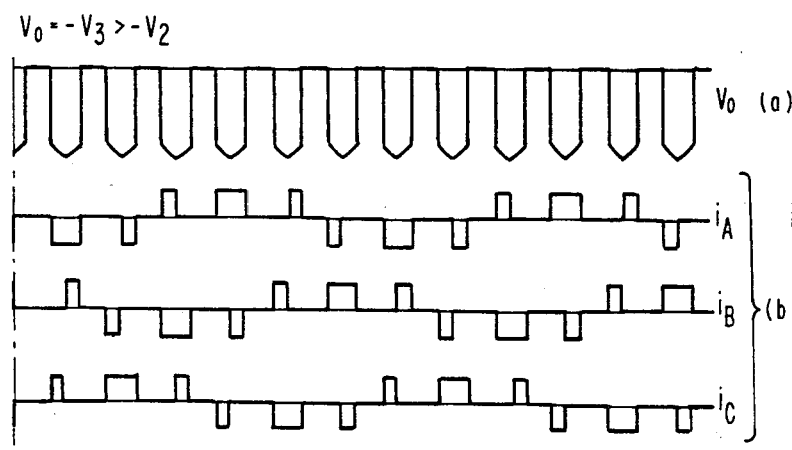
Figure 14F:
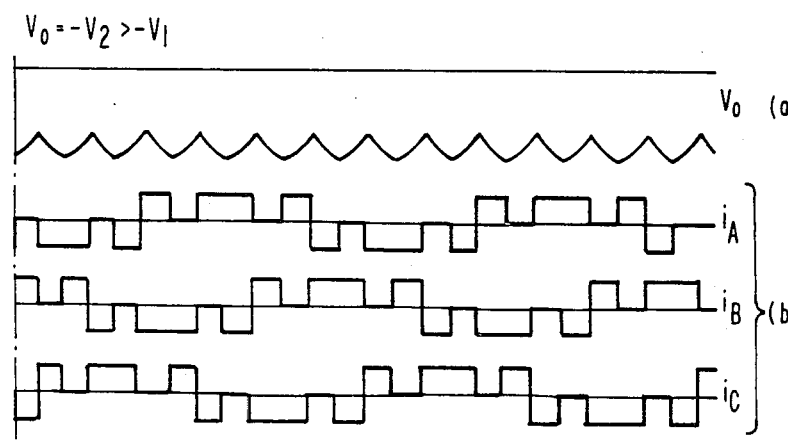

The more the central period of conduction of a thyristor is reduced, the more the diversionary stages will last, as shown by FIG. 15C, where $V_0=V_2<V_1$, and by the related FIG. 14C.

The main object of the present invention is to provide by using GTO devices an improvement over thyristor based fault survival strategies that have been used with the thyristor type of current-source converter. Superior results stem from the fact that GTO devices have the capability of force-commutation while, at the same time, being able to operate under natural commutation just like a thyristor when need arises.

There are four major fault categories for a current-source converter:

(1) An outright device failure—This event causes an AC line, and/or a DC terminal fault. Complete recovery is not possible unless the equipment is shut down and the failed device, or switch is replaced. In high power equipment, this type of fault is usually prevented by adding redundant devices to the design, so that a failure of a single switching device will not provoke an equipment fault.

(2) Control gate drive malfunctions—The result is a device not turning ON, or OFF, when it should in the normal gating sequence.

(3) DC terminal faults—This is the situation when there is a short circuit, or at least a much lower than normal impedance path, occurring at the converter DC terminals. There is little concern if the converter is operating as a DC-to-AC converter inversion mode, since the current will then naturally cease to flow. However, such faults may be of grave concern if the converter is operating as an AC-to-DC converter rectifier mode since large fault currents could appear unless the converter operation be modified.

(4) AC line voltage disturbances that cause "commutation failures"—Commutation failure in the thyristor situation is the failure of one device to turn ON in the normal sequence with the consequent failure to turn OFF another, namely, one immediately preceding in the normal sequence as when the AC line voltage is inadequate, or even nonexisted. Such faults are generally of little concern if the converter is operating as an AC-to-DC converter (rectification quadrant), since no overcurrent will result. These are, however, of grave concern when the converter is operating in the DC-to-AC (inversion) quadrant, since in such case large fault currents could occur.

The GTO neither helps, nor hinders, the situation where there is an outright device fault as in Case #1. The merit of using GTO devices will become apparent when understanding what happens after using GTO devices to implement fault survival strategies, as opposed to thyristors in a converter. First, it will appear that the use of GTO devices on converters allows exactly the same methods for fault-survival strategy but will substantially improve the fault-survival capabilities of a current-source converter system.

I. Considering first the case of a DC terminal fault (as in aforementioned Case #3), it has been said that such terminal faults are of little concern when operating in the inversion quadrant. The disappearance, or marked reduction, of the source voltage will simply cause a rapid delay in current and the converter can either:

(a) keep operating with an appropriate adjustment of the firing angle $\alpha$. This will do whether the converter uses thyristors or GTO's, or (b) cause a shutdown when the current reaches zero. Again this is valid for either thyristor, or GTO-based converters.

Figure 17A:
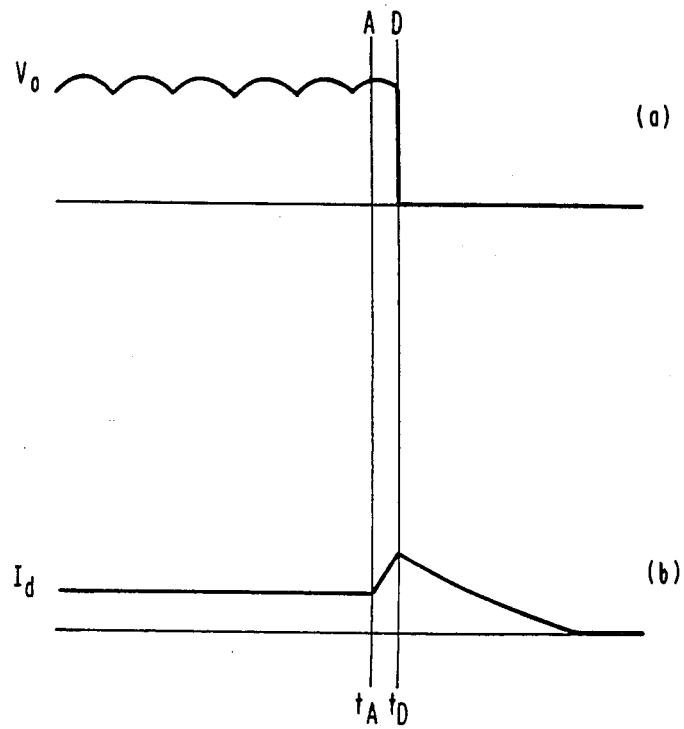
FIG. 17A in contrast to FIG. 16, illustrates with voltage and current waves the operation where the bridge has GTO devices and is controlled with freewheel action according to the present invention, upon load fault occurrence.
Figure 17B:
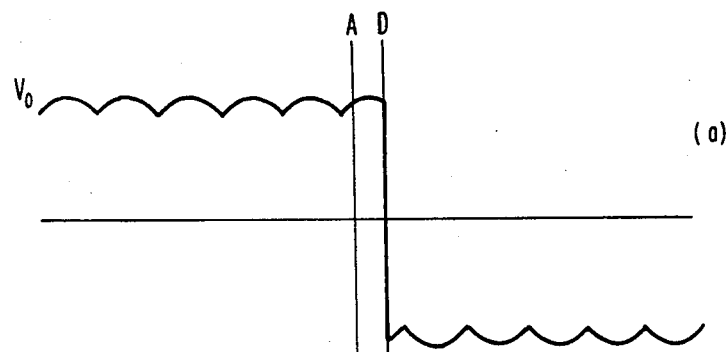
FIG. 17B is like FIG. 17A, but where control effects an immediate transfer from the rectifying to the inversion quadrant upon load fault event, also according to the invention.
Figure 17B:
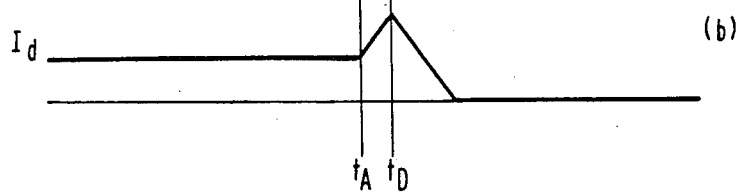

Again, in the instance of inversion-quadrant operation, the same control strategy can be used with GTO's as with thyristors. However, when operating in the rectification-quadrant, a thyristor-based converter has to be designed so as to withstand a fault current of the outputted voltage $V_o$ (rectification mode). Referring to FIG. 17, which shows the occurrences of a DC terminal fault (load fault) the DC current will rise, because at time A, the volt-seconds area (shown shaded under (a)), will in fact be applied to the current-sourcing (filter)

inductor. This usually will cause a marked increase of the current as shown under (b). Should the converter be caused at point B to enter the inversion-quadrant, so that at point B gating control in this quadrant can begin to operate, as shown in FIG. 17, the fault current is reduced, even to zero, if necessary. In principle GTO devices can be used to behave exactly like thyristors, so that a similar strategy can be employed with a GTO-based converter. However, taking advantage of having a GTO device, it becomes now possible to use an earlier instant than $t_B$ to enter the inversion-quadrant due to the GTO turn-OFF capability, thereby to be able to reduce the current well before instant B. The converter behavior of the prior art has now been enhanced by the use of GTO devices with the control system according to the invention.

Figure 16:
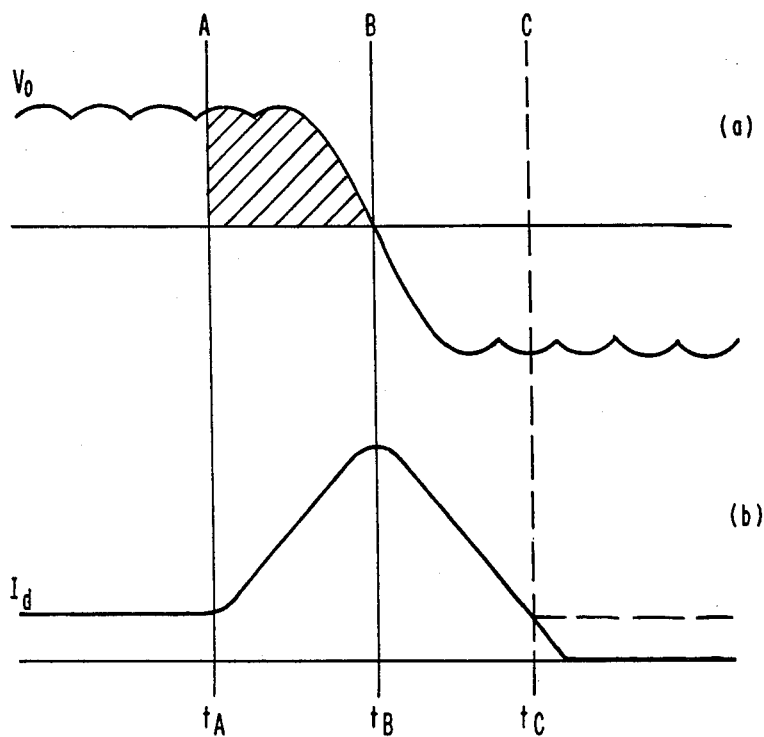
FIG. 16 shows the operation of an AC/DC converter entering the inversion quadrant upon the occurrence of a DC terminal fault, thereby to illustrate the conventional situation with thyristors in the bridge.

It is not even necessary to operate in the region between instants A and B of FIG. 16. With a GTO device it will become possible even to react ahead of the critical moment experienced with thyristors. The rate of rise of the fault current is usually quite slow, relative to the time frame of operation of an electronic switching device, because of the presence of the current-source inductor. Hence, there is time after the occurrence of a fault (time $t_A$ on FIGS. 17A and 17B) to establish by detection (according to FIGS. 4 or 4A) the presence of the fault (detection at time $t_D$ on FIGS. 17A and 17B) before the GTO current turn-OFF capability has been exceeded. Will be considered first the case where the converter is force-commutated, according to lines 202 and 202' and circuit FWG of FIG. 4, into a freewheel mode of operation, as shown in FIG. 17A. Then will be considered the case where the GTO converter is transferred immediately, by line 202 and mode transfer circuit MTR, to operate in the inversion quadrant, as shown in FIG. 17B. In the former case, the effect is to immediately remove the fault from the AC system and the DC current will be freewheeling down to zero. In the latter case, the AC system voltage is controlled with the proper GTO firing-angle through the inversion-quadrant, so as to force the AC current down to zero (or to a safe level). It appears that there is a notable difference when GTO's are used in place of thyristors in that there is no longer need (as illustrated in FIG. 16) to wait for the AC voltage, to which there is connection at the time of the fault, to pass through zero, before entering the inversion-quadrant. Control can be triggered immediately by virtue of the GTO turn-OFF ability. This reduces the fault burden, both on the devices and on the AC system.

Figure 18:
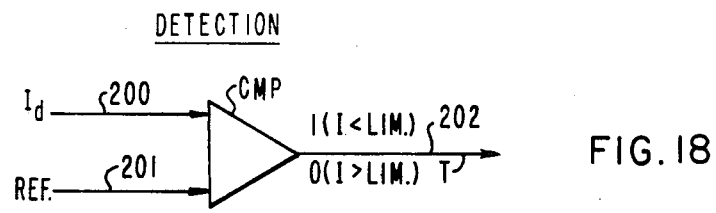
FIG. 18 shows the generation of a trigger command upon the detection of a DC fault and FIG. 19 shows mode transfer, both in the implementation of a system affording protective action like in FIGS. 17A and 17B, respectively.

Considering the situation of the transfer to the freewheel mode as in FIG. 17A, following detection of the overcurrent (obtained by sensing Id of FIG. 4, and applying the sensed signal on line 180 to a detector DT) at time $t_A$ of a clear increase of the DC link current $I_d$, as shown in FIG. 18, the detected signal representative of $I_d$ is applied by line 200 (FIGS. 4 and 18) to a comparator CMP responsive to a threshold reference signal in line 201. The outputted logic T on line 202 is a ONE when the limit is not exceeded, a ZERO when it is exceeded. The signal of line 202 is applied on line 115 to all the AND devices 25 of FIG. 11, thereby forcing the GTO devices by signals 1F-6F to be turned-OFF, with the consequence that the system goes immediately into the freewheeling mode according to FIG. 12A. The same result would be obtained for the inversion operating mode by applying the signal T of line 202 via lines 115 to the AND devices 125 of FIG. 11.

Considering now the situation of a transfer from a rectifying mode to an inversion mode as in FIG. 17B, sensing by line 180 on FIG. 4 at time $t_D$ an increase of $I_d$, like shown in FIGS. 18 and 19, is translated by detector DT (see line 200 into comparator CMP) into a command signal 202. This signal is amplified by amplifier circuit AMP the output of which is inputted by line 206 into a comparator SMP which normally receives on line 207 the rectifier mode control signal. The latter is the signal used on line 15 of FIG. 9 for comparator CMPP and line 23 when the operation is in such rectifier mode. The outputted signal of line 15 leads to the comparators CMP1 and CMP2 of FIG. 9. Should current $I_d$ of line 200 in FIG. 18 lead to a command signal T on line 202 (FIG. 19) to indicate the occurrence of the critical event at time $t_D$, the amplifier circuit AMP will provide on line 206 a command signal overriding the reference signal of line 207. With this signal of line 206 on line 15, the signal will be such that comparators CMP1, CMP2 will be forced (as CMPN and line 22) to operate at the peak of the ramp of FIG. 10 (maximum $+v_e$). When this occurs, the bridge of FIG. 4 is immediately forced to operate at the inversion end-stop firing angle, whatever the operating mode may have been at that instant. If it were in the rectifying mode as earlier assumed, it will go to the inversion quadrant mode.

Figure 20:
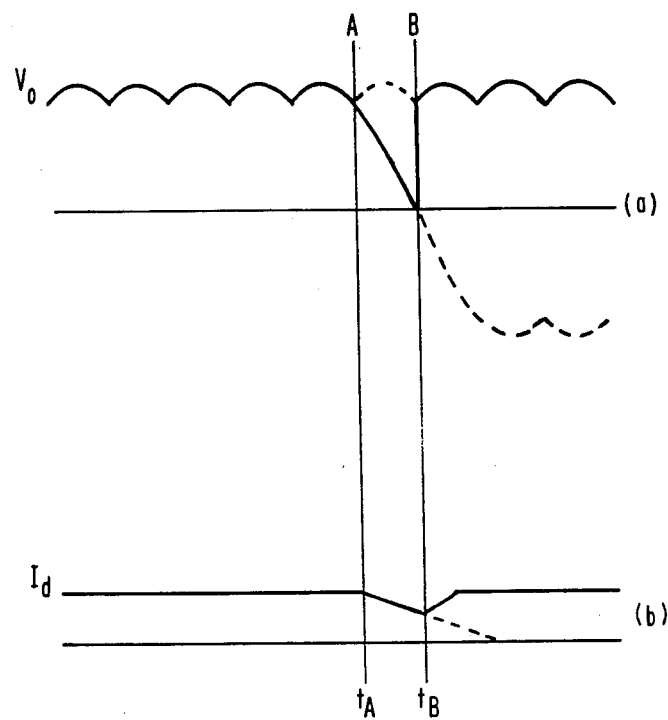
FIG. 20 depicts current and voltage upon a commutation fault when in the rectification mode.

II. Considering now the case of a commutation fault (as in the above Case #4) as earlier stated, these are generally of little concern in the rectification region since, as depicted in FIG. 16, the current (curve (b)) will generally decay immediately following such a fault, when the active devices, automatically passes into the inversion region. Normal strategy in a thyristor converter is to allow the operation of the converter to proceed further normally and to attempt to restore normal operation at the next available opportunity, following point B on the voltage curve (b) in FIG. 20. Thus with GTO's and thyristors, in such narrow context the same strategy can be applied.

When operating in the inversion region, however, commutation faults are serious for thyristor converters because of the large fault currents that normally follow. As depicted by curve (a) in FIG. 21, a thyristor converter having commutation fault will normally experience a large overcurrent (curve (b)) because the DC source will drive a linearly increasing current component in the current-source reactor, and the converter, if there is still AC voltage present (curve (a)), will pass into the rectification quadrant, which will further increase the current, as a result. As shown under (b) in FIG. 21, current $I_d$ will tend, without GTO's and freewheeling according to the present invention, to go very high. With GTO's and freewheeling action, though, as shown in dotted line, the current is much less. Moreover, the GTO devices allow to attempt recovery immediately following such failure of commutation, at possible operative points such as A, B, C or D, which are all lower than would be the case in the absence of GTO devices, namely at A', B', C', D' on the solid line current curve.

Figure 21:
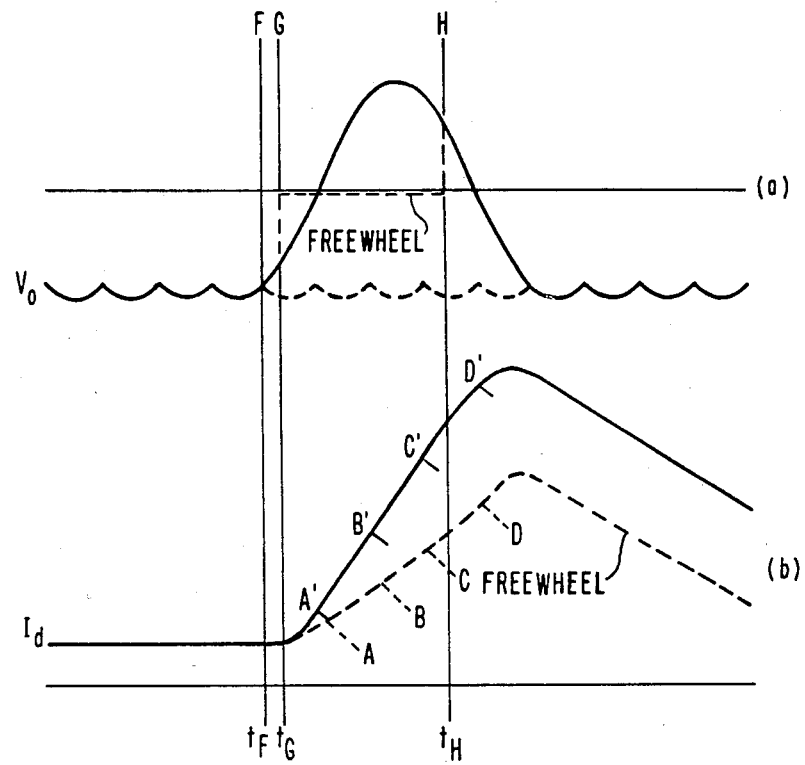
FIG. 21 shows the occurrence of a commutation fault when in the inversion mode and indicates the degrees of freedom afforded by GTO device action.

As soon as, at any point A, B, C, D on the curve of FIG. 21, recovery has been made, the no-fault condition will appear for instance on line 311 of FIG. 4A which is detected by detector DT2. As a result gating circuit GC2 is disabled by line 313, and normal gating is restored by gating current GC1 on lines 211 and 213 according to the prescribed firing sequence in the example illustrated.

We claim:

1. In a current source AC/DC converter including: a bridge of main GTO switches connected for sequential firing between AC phase lines and DC terminals; and control means for initiating the conduction of said main GTO switches in a sequential order with a firing angle corresponding to a rectifier mode of operation while interrupting the conduction of a conducting one of said main GTO switches after a time interval of selected duration, thereby to control the voltage at the output of the converter;

the combination of:
means for detecting the occurrence of an over-current indicative of a DC fault condition on the DC side of the bridge and for generating a command signal upon such occurrence;
overriding means responsive to said command signal and operative upon said control means for instantly turning OFF by priority one of said main GTO switches having been turned ON in the sequence of said sequential firing and operative concurrently to turn ON an additional GTO switch to provide an immediate path for said overcurrent, thereby to protect the bridge from the overcurrent caused by said DC fault.

2. The converter of claim 1 with said additional GTO switch being an auxiliary freewheeling switch connected across said DC terminals.

3. The converter of claim 1 with said additional GTO switch being one of said main GTO switches selected for conduction to freewheel current between said DC terminals.

4. The converter of claim 1 with said additional GTO switch being one of said main GTO switches selected for providing a diversionary path through said bridge toward said AC phase lines.

5. In a current source AC/DC converter including: a bridge of main GTO switches connected for sequential firing between AC phase lines and DC terminals; and control means for initiating the conduction of said main GTO switches in sequential order with a firing angle corresponding to a rectifier mode of operation for said converter while interrupting the conduction of a conducting one of said main GTO switches after a time interval of selected duration, thereby to control the voltage at the output of the converter; said control means including means for selecting another firing angle corresponding to an inversion mode of operation for said converter;

the combination of:
means for detecting the occurrence of an over-current indicative of a DC fault condition on the DC side of the bridge and for generating a command signal upon such occurrence;
said selecting means being operatively responsive to said command signal and said control means being operative in response thereto for instantly and by priority firing said main GTO switches under said another firing angle in the sequence of said sequential firing, thereby to operate the converter in the inversion mode and to protect the bridge from the overcurrent caused by said DC fault.

6. In a current source DC/AC converter including: a bridge of main GTO switches connected for sequential firing between DC terminals and a load on AC phase lines; and control means for initiating the conduction of said main GTO switches in sequential order with a firing angle corresponding to an inversion mode of operation while interrupting the conduction of a conducting one of said main GTO switches after a time interval of selected duration, thereby to control the voltage at the output of the converter;

the combination of:
means for detecting the occurrence of a commutation fault condition on the AC side of the bridge and for generating a command signal upon such occurrence;
overriding means responsive to said command signal and operative upon said control means for instantly turning OFF by priority one of said main GTO switches having been turned ON in the sequence of said sequential firing and operative concurrently to turn ON an additional GTO switch to immediately prepare a current path for a fault current, thereby to protect the bridge from an overcurrent caused by a DC fault resulting from said commutation fault.

7. In a current source DC/AC converter including: a bridge of main GTO switches connected for sequential firing between DC terminals and a load on AC phase lines; and control means for initiating the conduction of said main GTO switches in sequential order with a firing angle corresponding to an inversion mode of operation while interrupting the conduction of a conducting one of said main GTO switches after a time interval of selected duration, thereby to control the voltage at the output of the converter; said control means including means for selecting another firing angle corresponding to a rectifier mode of operation for said converter;

the combination of:
means for detecting the occurrence of a commutation fault condition on the AC side of the bridge and for generating a command signal upon such occurrence;
said selecting means being operatively responsive to said command signal and said control means being operative in response thereto for instantly and by priority firing said main GTO switches under said another firing angle in the sequence of said sequential firing, thereby to operate the converter in the rectifier mode and to protect the bridge from an overcurrent caused by a DC fault resulting from said communication fault.

* * * * *